US012372900B2

(12) United States Patent
Kobayashi et al.

(10) Patent No.: US 12,372,900 B2
(45) Date of Patent: Jul. 29, 2025

(54) IMAGE FORMING APPARATUS

(71) Applicant: CANON KABUSHIKI KAISHA, Tokyo (JP)

(72) Inventors: Manato Kobayashi, Chiba (JP); Yusuke Minato, Chiba (JP); Izuru Tanaka, Tokyo (JP); Ryosuke Tsuruga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/512,769

(22) Filed: Nov. 17, 2023

(65) Prior Publication Data

US 2024/0168414 A1 May 23, 2024

(30) Foreign Application Priority Data

Nov. 18, 2022 (JP) ................................ 2022-185330
Aug. 8, 2023 (JP) ................................ 2023-129659

(51) Int. Cl.
*G03G 15/20* (2006.01)
*G03G 15/16* (2006.01)

(52) U.S. Cl.
CPC .................................. *G03G 15/162* (2013.01)

(58) Field of Classification Search
CPC . G03G 15/1605; G03G 15/161; G03G 15/162
USPC ........................................ 399/297, 302, 308
See application file for complete search history.

(56) References Cited

U.S. PATENT DOCUMENTS 7,567,765 B2 * 7/2009 Chiba .................... G03G 15/50 399/302
7,639,974 B2 * 12/2009 Kimura ............. G03G 15/1605 399/296
7,689,152 B2 * 3/2010 Nishida ............... G03G 15/161 399/302
2006/0209151 A1 9/2006 Tamiya et al.
2024/0168414 A1 5/2024 Kobayashi et al.

FOREIGN PATENT DOCUMENTS

JP 08-166728 A 6/1996
JP 2006-267486 A 10/2006
JP 2006-301577 A 11/2006
JP 2007-171784 A 7/2007

* cited by examiner

*Primary Examiner* — Hoan H Tran
(74) *Attorney, Agent, or Firm* — Venable LLP

(57) ABSTRACT

In a cross-section perpendicular to a rotational axis of a first image bearing member, when a common tangential line between the first image bearing member and a second image bearing member on an intermediary transfer belt side is a rectilinear line L, a rectilinear line passing through a rotation center of the first image bearing member and a rotation center of a first transfer member is a rectilinear line P, and a rectilinear line passing through an intersection point between the rectilinear line P and the first image bearing member and perpendicular to the rectilinear line P is a rectilinear line Q, an electrode member is constituted so that the contact portion contacting an inner surface of the belt is positioned further on a first image bearing member side than the rectilinear line L is and further on a first transfer member side than the rectilinear line Q is.

26 Claims, 19 Drawing Sheets

IMAGE FORMING APPARATUS

FIELD OF THE INVENTION AND RELATED ART

The present invention relates to an image forming apparatus such as a copying machine, a printer, a facsimile machine, or a multi-function machine having a plurality of functions of these machines, of an electrophotographic type or an electrostatic recording type.

As an image forming apparatus, such as a color copying machine, a color printer, or a color multi-function machine, of the electrophotographic type, an image forming apparatus of an intermediary transfer type has become mainstream since the image forming apparatus has advantages such that downsizing of an apparatus main assembly and adaptation to various recording materials are relatively easy. The image forming apparatus of the intermediary transfer type includes, in general, a constitution provided with a plurality of photosensitive drums and an intermediary transfer belt. Further, in such an image forming apparatus, toner images formed on the photosensitive drums are electrostatically primary-transferred successively onto the intermediary transfer belt, and then the toner images on the intermediary transfer belt are electrostatically secondary-transferred onto a recording material such as paper.

In the image forming apparatus as described above, it is difficult to uniformly transfer the toner images onto, for example, embossed paper with an uneven surface, or the like. Particularly, transfer of the toner images onto a recessed portion of the embossed paper is liable to become difficult due to a necessity of a relatively large transfer electric field since a gap is formed between the intermediary transfer belt and the embossed paper in a secondary transfer portion.

On the other hand, in Japanese Laid-Open Patent application No. 2006-267486, a technique using a secondary transfer voltage in the form of a DC voltage biased with an AC voltage is proposed.

However, in the case where the secondary transfer voltage in the form of the DC voltage biased with the AC voltage is used, due to toner scattering, a micro image quality such as a thin line is liable to lower. For that reason, it has been desired that a transfer property of the toner image onto a recording material, such as the embossed paper, which is relatively difficult to transfer the toner image thereon is improved even in the case where a secondary transfer voltage consisting only the DC voltage is used.

Incidentally, in the above, as the recording material which is relatively difficult to transfer the toner image thereon, the embossed paper is cited as an example, but this is also true for a recording material relatively high in electric resistance (high-resistance paper) such as synthetic paper principally formed with a synthetic resin material, or a resin film. Further, the present invention does not exclude use of the secondary transfer voltage of the DC voltage biased with the AC voltage.

SUMMARY OF THE INVENTION

A principal object of the present invention is to provide an image forming apparatus capable of improving a transfer property of a toner image onto a recording material such as embossed paper, which is relatively difficult in transfer of the toner image thereon in an image forming apparatus of an intermediary transfer type.

This object has been accomplished by the image forming apparatus according to the present invention.

According to an aspect of the present invention, there is provided an image forming apparatus comprising a first image bearing member configured to bear a toner image; a second image bearing member configured to bear a toner image; an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt; a first transfer member provided downstream of the first image bearing member with respect to the movement direction of the intermediary transfer belt and configured to transfer the toner image from the image bearing member onto the intermediary transfer belt in a first transfer portion under application of a first transfer voltage; a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt and that includes a contact portion contacting an inner surface of the intermediary transfer belt, wherein a voltage of a polarity opposite to a polarity of the first transfer voltage is applied to the electrode member, wherein in a cross section perpendicular to a rotational axis of the first image bearing member, when a common tangential line between the first transfer member and the second image bearing member on an intermediary transfer belt side is a rectilinear line L, a rectilinear line passing through a rotation center of the first image bearing member and a rotation center of the first transfer member is a rectilinear line P, and a rectilinear line passing through an intersection point between the rectilinear line P and the first image bearing member and perpendicular to the rectilinear line P is a rectilinear line Q, the electrode member is configured so that the contact portion is positioned further on a first image bearing member side than the rectilinear line L is and further on a first transfer member side than the rectilinear line Q is.

Further features of the present invention will become apparent from the following description of exemplary embodiments with reference to the attached drawings.

Figure 3:
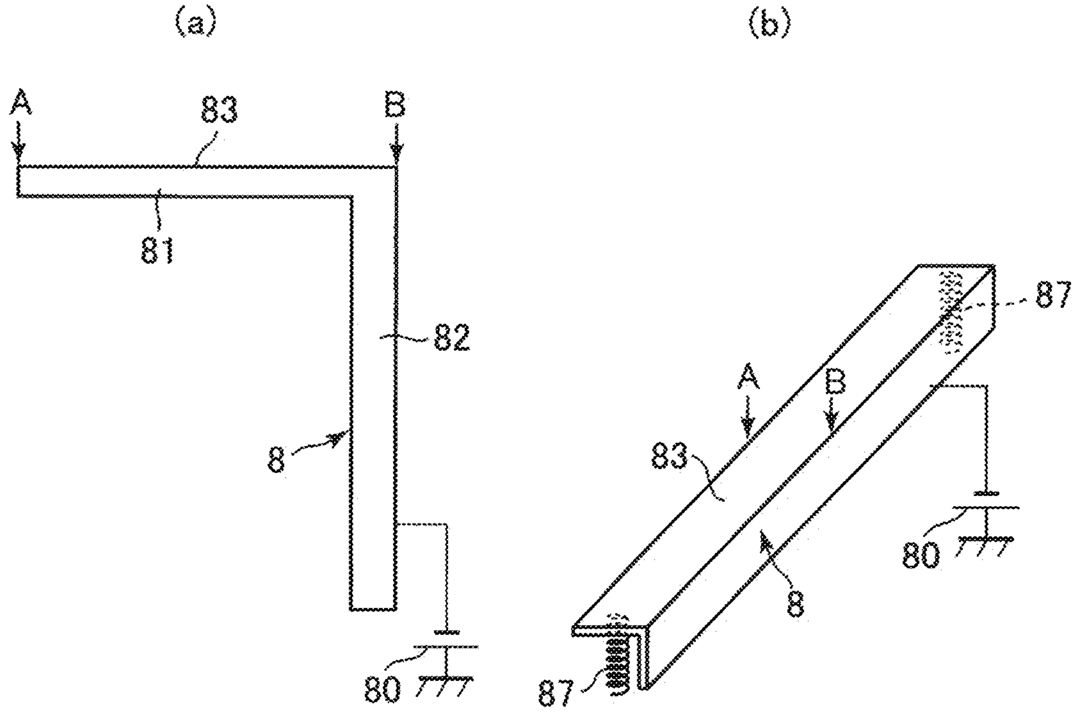

Parts (a) and (b) of FIG. 3 are a sectional view and a perspective view, respectively, of a potential regulating member.

Figure 4:
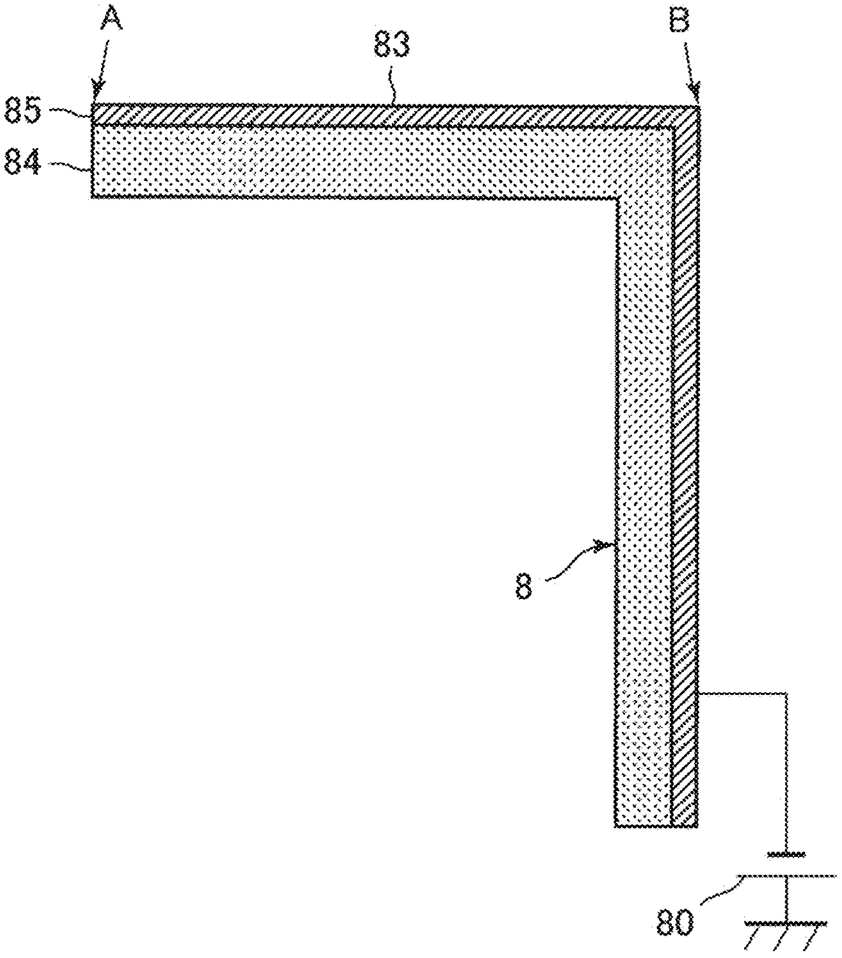

FIG. 4 is a sectional view of the potential regulating member in another example.

Figure 5:
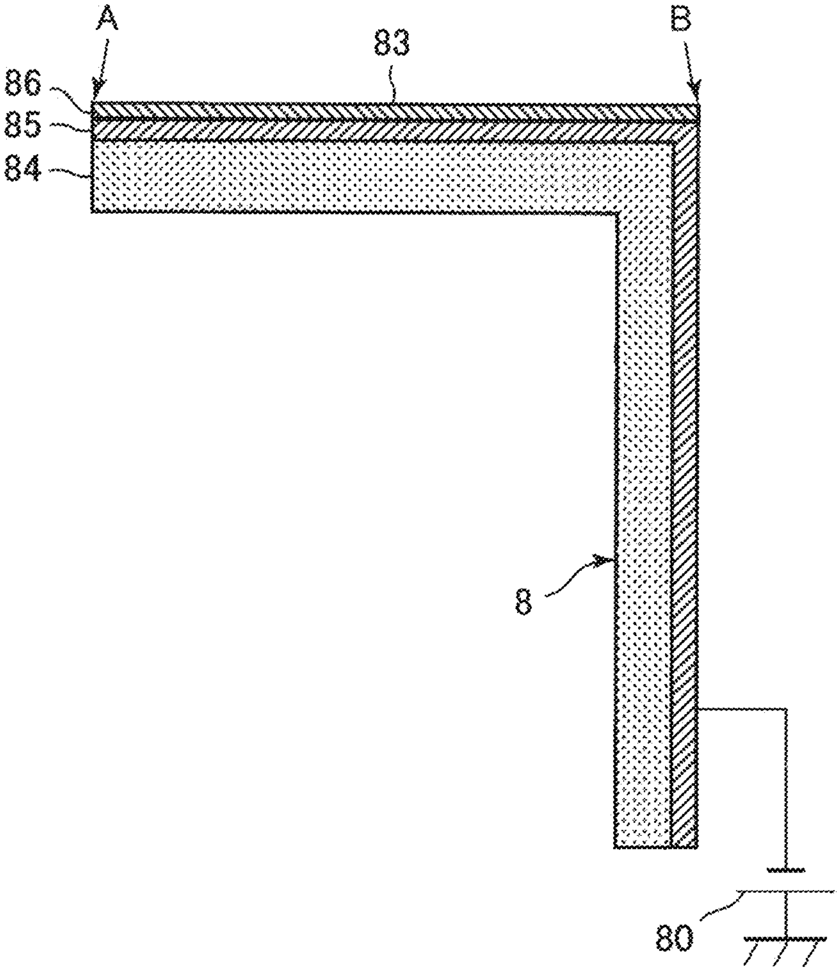

FIG. 5 is a sectional view of the potential regulating member in another example.

Figure 6:
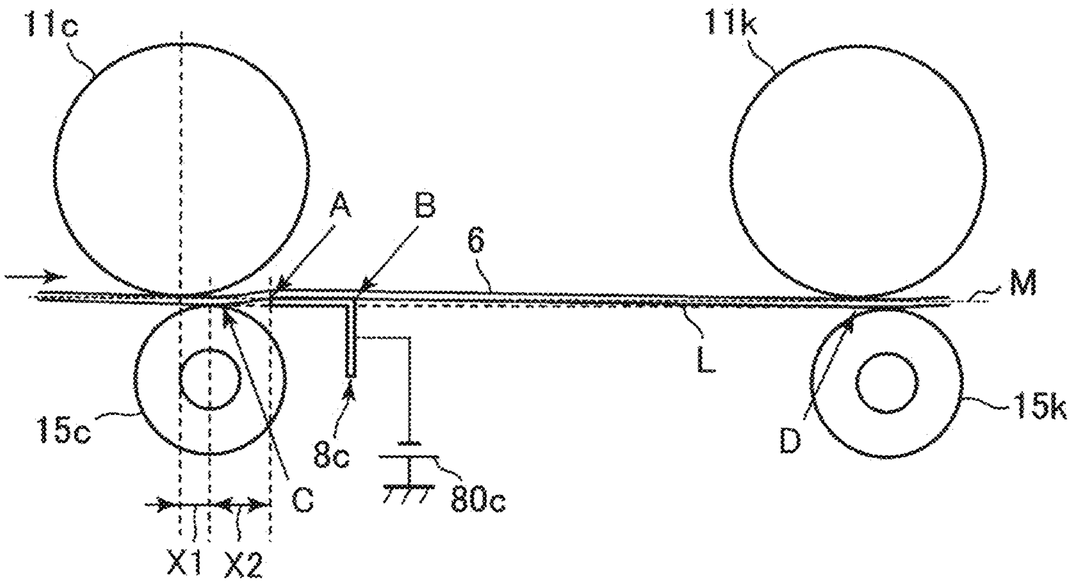

FIG. 6 is a sectional view for illustrating an arrangement of the potential regulating member.

Figure 7:
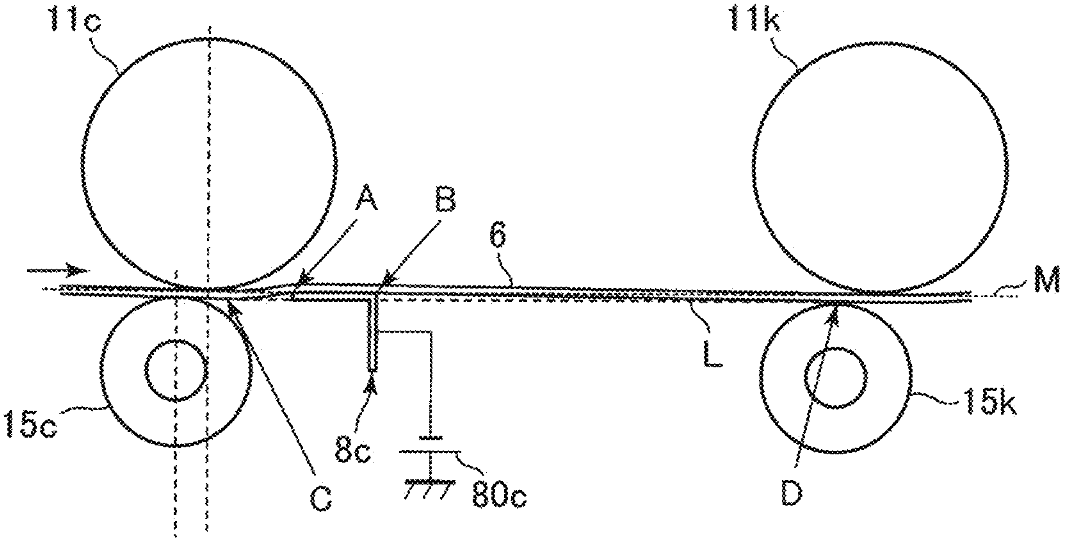

FIG. 7 is a sectional view for illustrating an arrangement of the potential regulating member.

Figure 8:
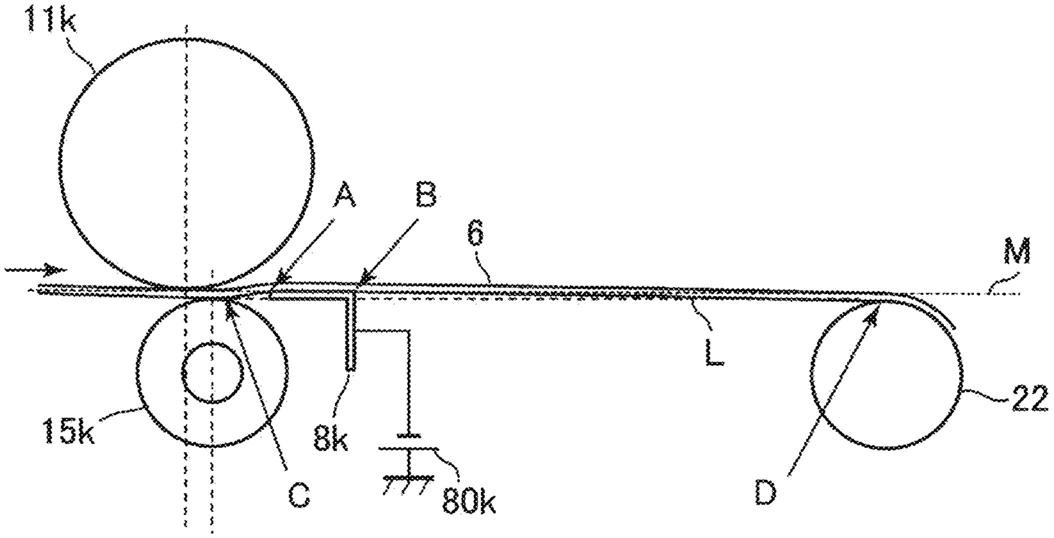

FIG. 8 is a sectional view for illustrating an arrangement of the potential regulating member.

Figure 9:
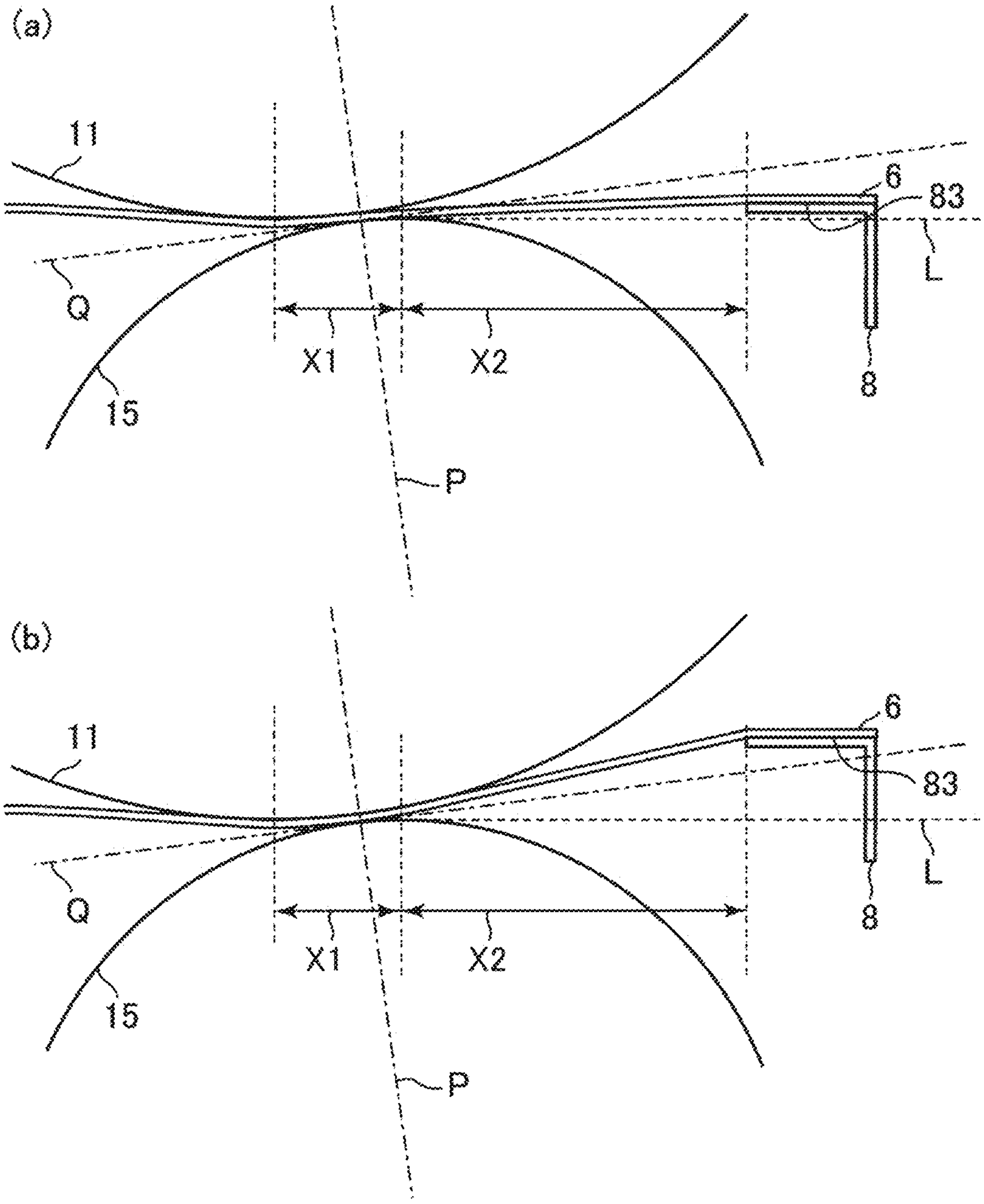

Pats (a) and (b) of FIG. 9 are sectional views each for illustrating an arrangement of the potential regulating member.

Figure 10:
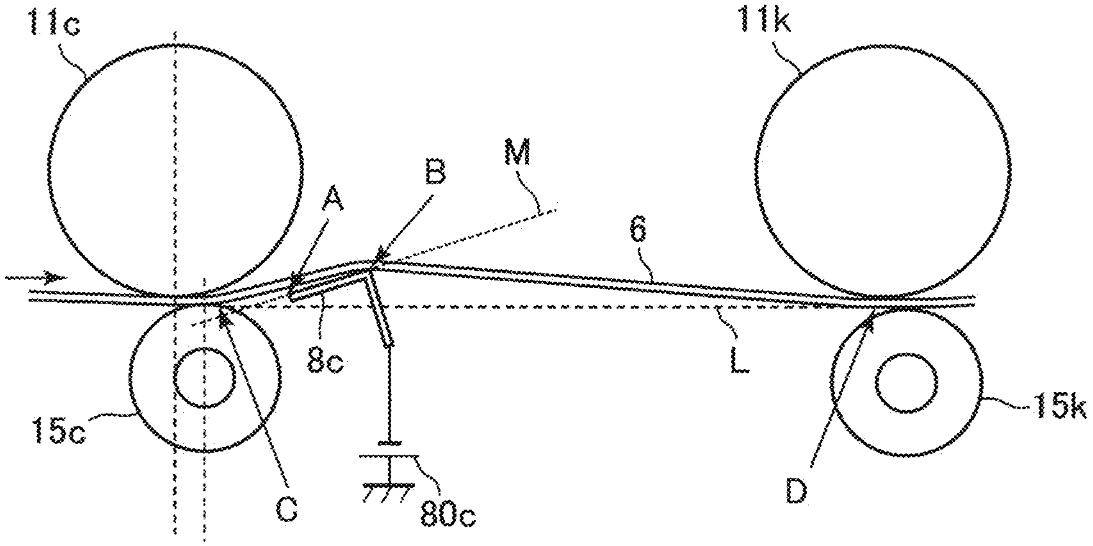

FIG. 10 is a sectional view for illustrating an arrangement of the potential regulating member.

Figure 11:
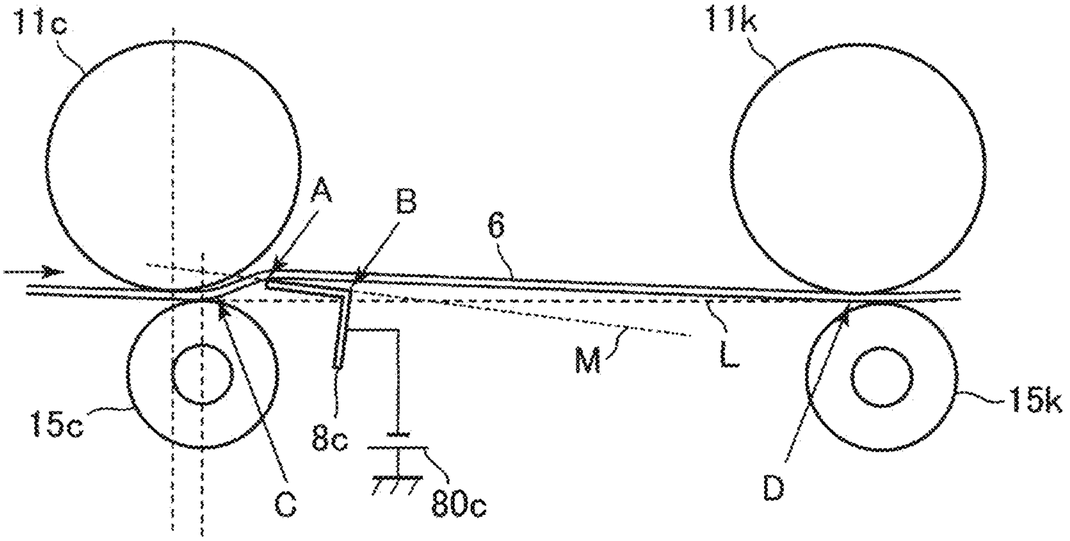

FIG. 11 is a sectional view for illustrating an arrangement of the potential regulating member.

Figure 12:
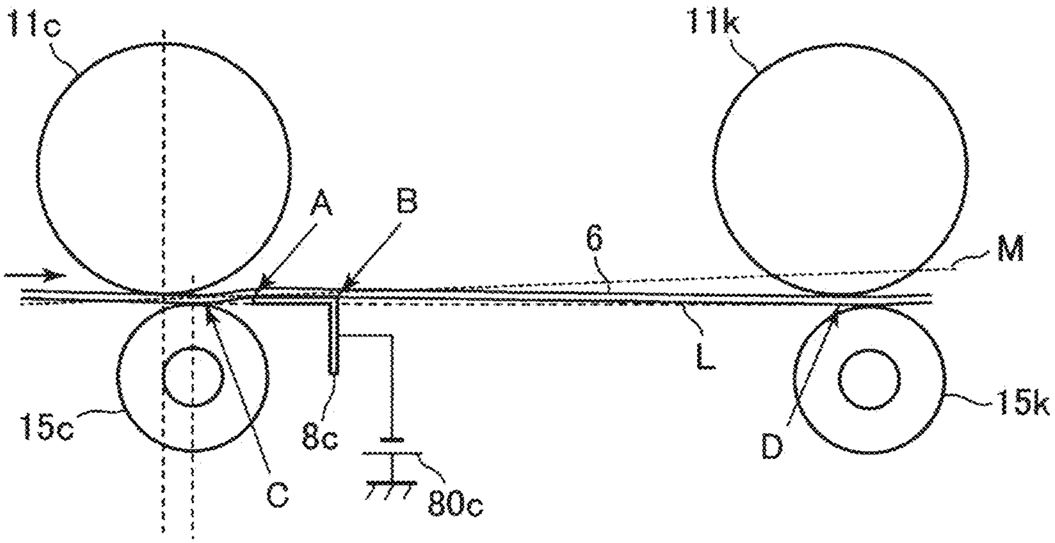

FIG. 12 is a sectional view for illustrating an arrangement of the potential regulating member.

Figure 13:
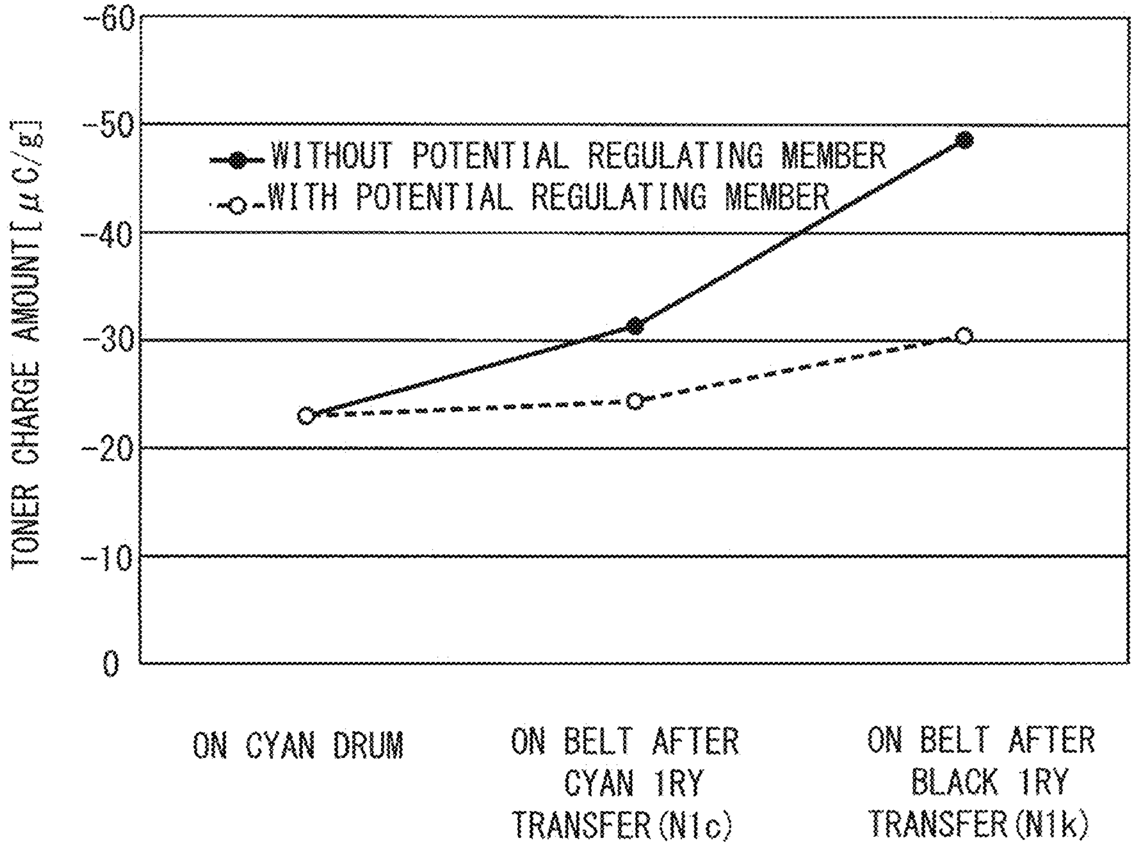

FIG. 13 is a graph for illustrating an effect of the potential regulating member.

Figure 14:
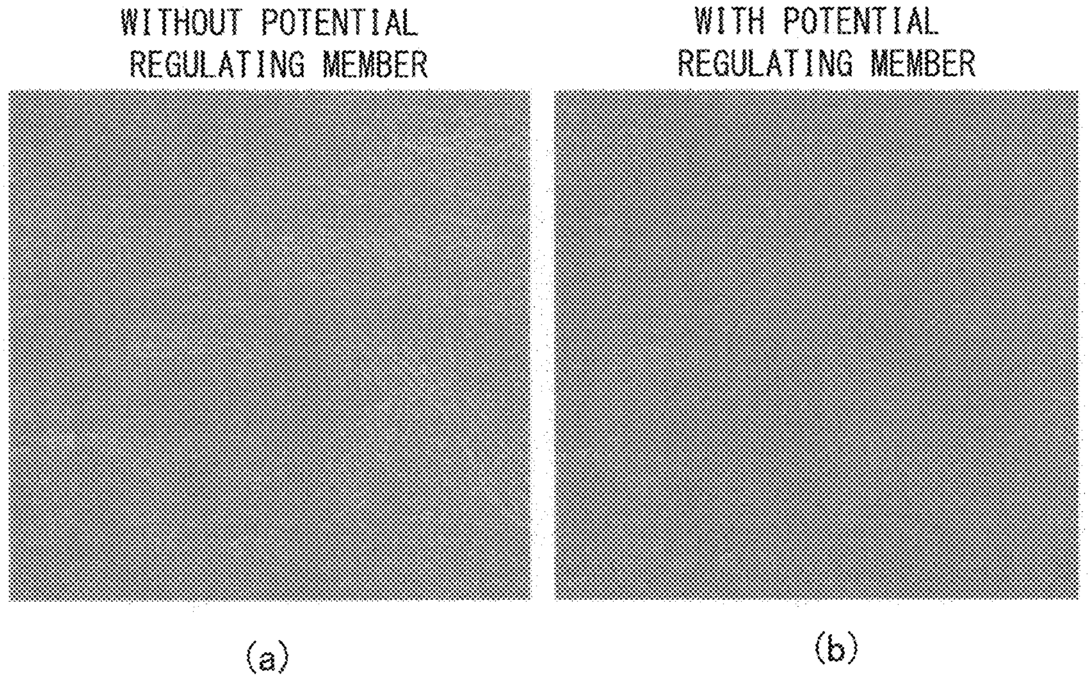

Parts (a) and (b) of FIG. 14 are photographic views for illustrating the effect of the potential regulating member.

Figure 15:
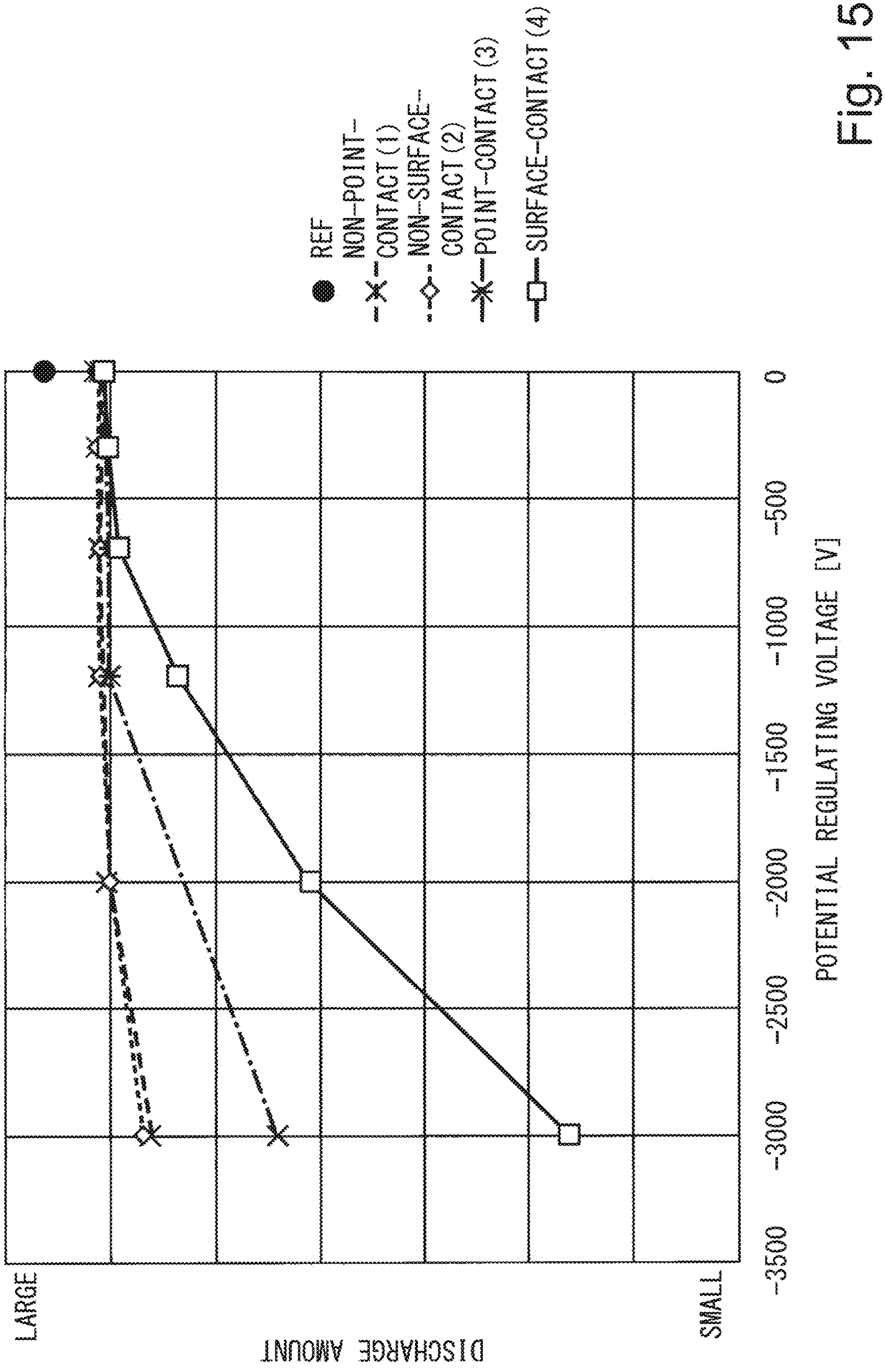

FIG. 15 is a graph for illustrating the effect of the potential regulating member.

Figure 16:
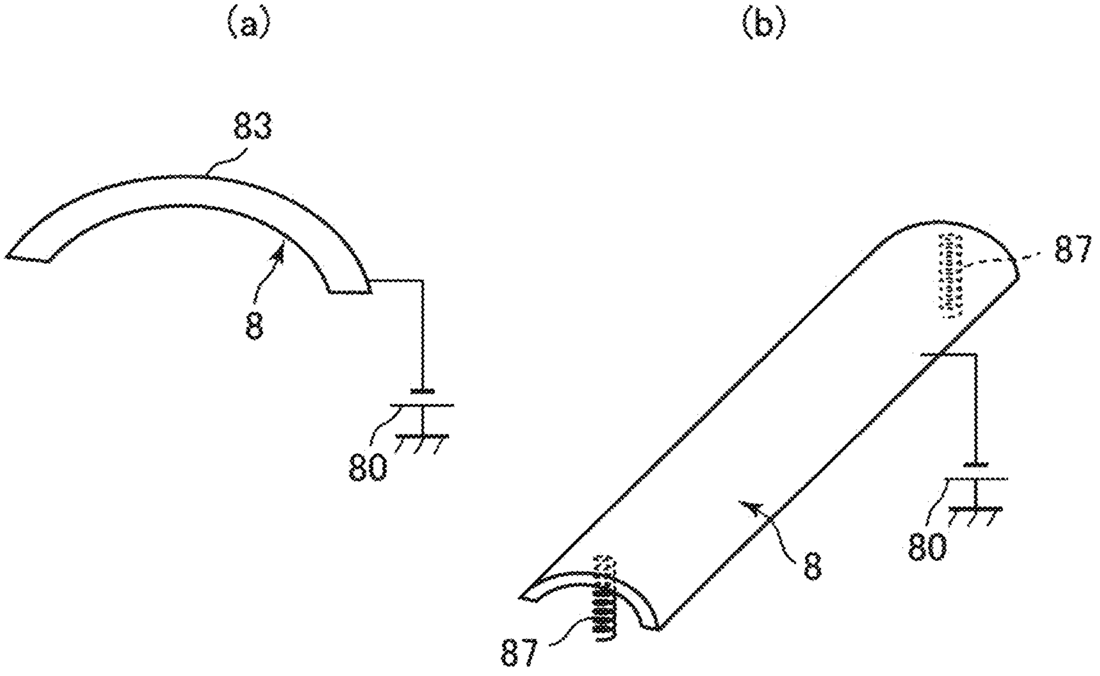

Parts (a) and (b) of FIG. 16 are a sectional view and a perspective view, respectively, of a potential regulating member in another embodiment.

Figure 17:
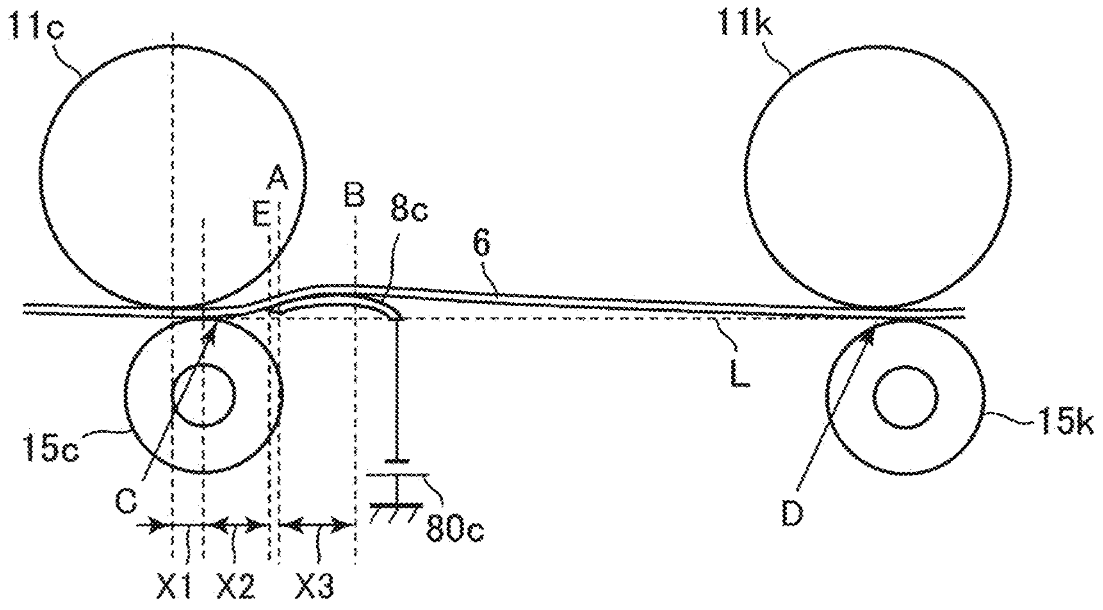

FIG. 17 is a sectional view for illustrating an arrangement of the potential regulating member.

Figure 18:
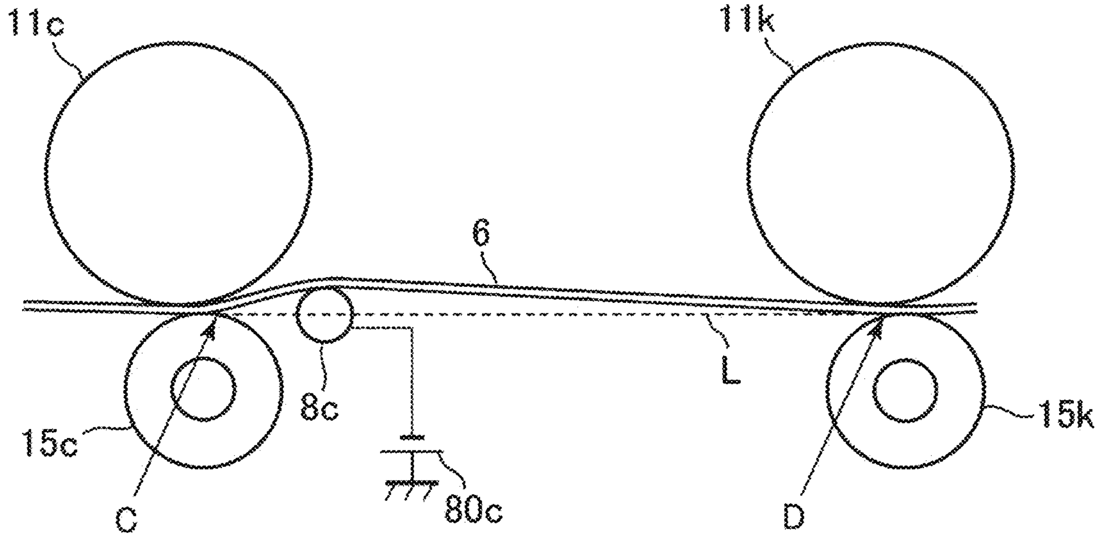

FIG. 18 is a sectional view for illustrating a potential regulating member in another example.

Figure 19:
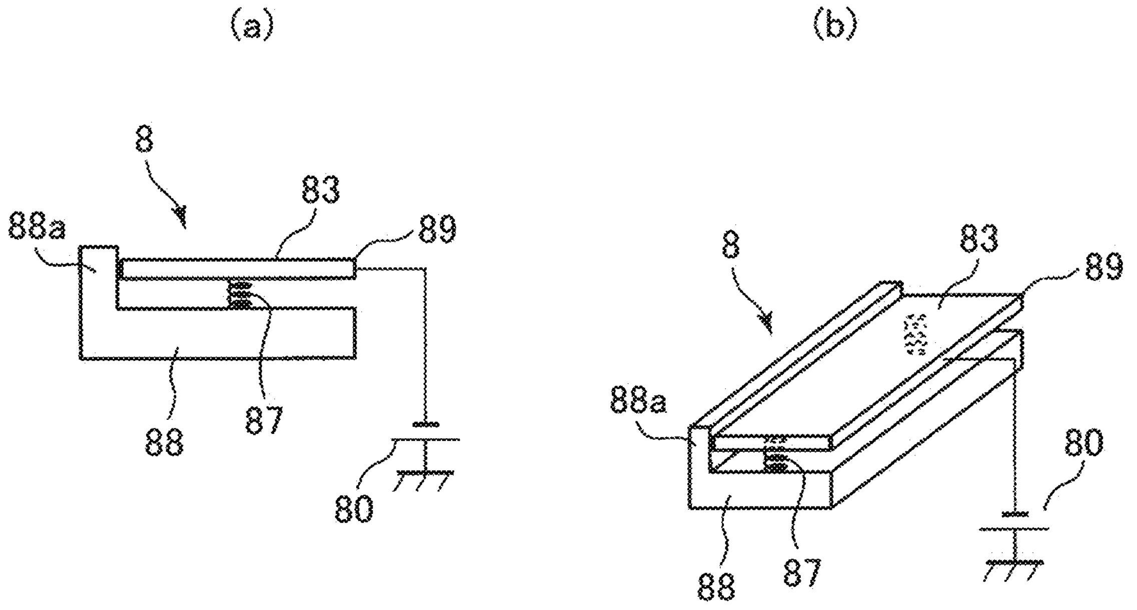

Parts (a) and (b) of FIG. 19 are a sectional view and a perspective view, respectively, for illustrating a potential regulating member in another embodiment.

DESCRIPTION OF EMBODIMENTS

In the following, the image forming apparatus according to the present invention will be described in more detail with reference to the drawings.

Embodiment 1

1. General Structure and Operation of Image Forming Apparatus

Figure 1:
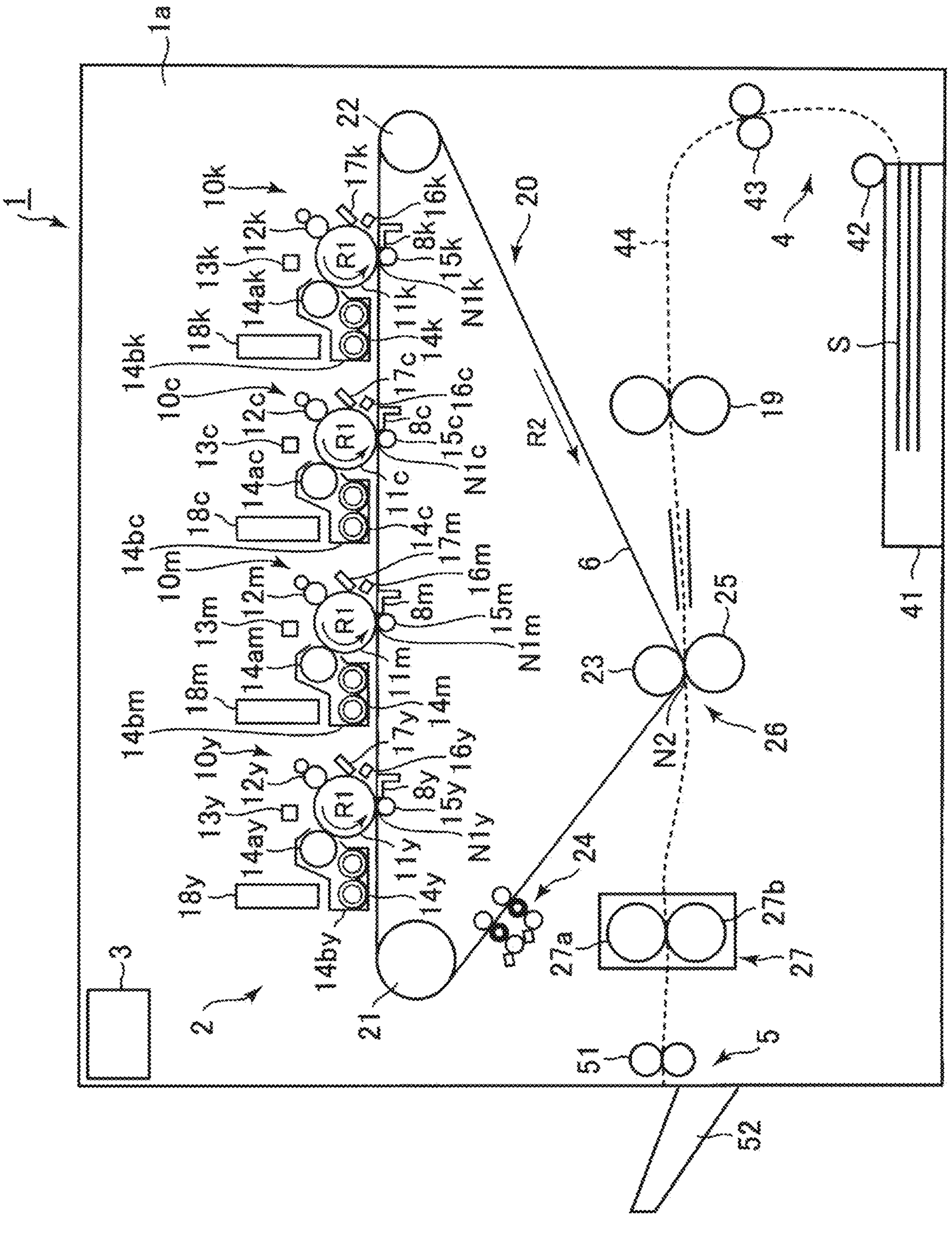
FIG. 1 is a schematic sectional view of an image forming apparatus.

First, a general structure and an operation of the image forming apparatus of this embodiment will be described. FIG. 1 is a schematic sectional view of an image forming apparatus 1 of this embodiment. The image forming apparatus 1 of this embodiment is a tandem type full-color printer capable of forming a full-color image on a sheet-like recording material S by using an electrophotographic type method and employing an intermediary transfer type system.

The image forming apparatus 1 includes image forming portion 2, a controller 3, a feeding portion 4 of the recording material S, and a discharging portion 5 of the recording material S. Further, inside the image forming apparatus 1, a temperature sensor 71 (FIG. 2) capable of detecting a temperature inside the apparatus and a humidity sensor 72 (FIG. 2) capable of detecting a humidity inside the apparatus are provided. The image forming apparatus 1 is capable of forming an image on the recording material S on the basis of image information (image signal) acquired by an original reading apparatus (not shown) provided on the image forming apparatus 1 or connected to the image forming apparatus 1. Further, the image forming apparatus 1 is capable of forming an image on the recording material S on the basis of image information (image signal) from an external device (not shown), such as a personal computer (host device), a digital camera, or a smartphone, connected to the image forming apparatus 1. Incidentally, the recording material (transfer material, recording medium sheet) S is material on which a toner image is formed, and specific examples thereof include plain paper, thick paper, gloss coated paper, matte coated paper, embossed paper, or synthetic resin sheets (synthetic paper) which are substitutes for plain paper or the like, and overhead projector sheets (resin film). Here, the recording material S is referred to as "paper" ("paper", "embossed paper", "high-resistance paper", or the like in some instances), but even in that case, the recording material S includes a material other than the paper or a recording material formed with a material containing the material other than the paper.

The image forming portion 2 forms the image on the recording material S fed from the feeding portion 4 on the basis of the image information. The image forming portion 2 includes image forming units 10*y*, 10*m*, 10*c*, 10*k*, toner bottles 18*y*, 18*m*, 18*c*, 18*k*, exposure devices 13*y*, 13*m*, 13*c*, 13*k*, an intermediary transfer unit 20, a secondary transfer device 26, and a fixing device 27. The image forming units 10*y*, 10*m*, 10*c* and 10*k* form toner images of colors of yellow (Y), magenta (M), cyan (C), and black (K), respectively. Elements having the same or corresponding functions of structures provided for the respective colors will be collectively described by omitting suffixes y, m, c and k for representing elements for associated colors, respectively, in some instances. Further, the image forming apparatus 1 can also form, for example, a single-color image such as a (single) black image or a multi-color image by using the image forming unit(s) 10 for a desired single color or some of the four colors.

The image forming unit 10 includes a photosensitive drum 11 which is a drum-type (cylindrical) photosensitive member (electrophotographic photosensitive member) as an image bearing member. In addition, the image forming portion 10 includes a charging roller 12 which is a roller-type charging member as charging means. In addition, the image forming portion 10 includes a developing device 14 as developing means. In addition, the image forming portion 10 includes a pre-exposure device 16 as a discharging (charge eliminating) means. In addition, the image forming portion 10 includes a drum cleaning device 17 as a photosensitive member cleaning means. The image forming unit 10 forms a toner image on an intermediary transfer belt 6 described hereinafter.

The photosensitive drum 11 is movable (rotatable) while carrying an electrostatic image (electrostatic latent image) or a toner image. In this embodiment, the photosensitive drum 11 is a negatively chargeable organic photosensitive member (OPC) having an outer diameter of 30 mm. The photosensitive drum 11 has an aluminum cylinder as a substrate and a surface layer formed on the surface of the substrate. In this embodiment, as the surface layer, three layers of an undercoat layer, a photocharge generation layer, and a charge transportation layer, which are applied and laminated on the substrate in the order named are provided. When an image forming operation is started, the photosensitive drum 11 is rotationally driven in a direction indicated by an arrow R1 (counterclockwise) in the figure at a predetermined peripheral speed (process speed) by a driving motor (not shown) as a driving means.

The surface of the rotating photosensitive drum 11 is uniformly electrically charged by the charging roller 12. In this embodiment, the charging roller 12 is a rubber roller which contacts the surface of the photosensitive drum 11 and which is rotated by the rotation of the photosensitive drum 11. To the charging roller 12, a charging power source 73 (FIG. 2) as a charging voltage applying means (charging voltage applying portion) is connected. The charging power source 73 applies a predetermined charging voltage (charging bias) to the charging roller 12 during the charging process.

The surface of the charged photosensitive drum 11 is scanned and exposed by the exposure device 13 in accordance with the image information, so that an electrostatic image is formed on the photosensitive drum 11. The exposure device 13 is a laser scanner in this embodiment. The exposure device 13 emits laser beam in accordance with separated color image information outputted from the controller 3, and scans and exposes the surface (outer peripheral surface) of the photosensitive drum 11.

The electrostatic image formed on the photosensitive drum 11 is developed (visualized) by supplying the toner thereto by the developing device 14, so that a toner image (developer image) is formed on the photosensitive drum 11. In this embodiment, the developing device 14 is a two-component developing device using, as a developer, a two-component developer comprising toner (non-magnetic toner particles) and a carrier (magnetic carrier particles). In a developing container (developing main body) 14*b* of the developing device 14, the two-component developer is accommodated, and toner in an amount corresponding to a consumed amount of the toner is supplied from the toner bottle 18. The developing device 14 includes a developing sleeve 14*a* as a developing member (developer carrying member). The developing sleeve 14*a* is made of, for example, a nonmagnetic material such as aluminum or nonmagnetic stainless steel (aluminum in this embodiment). Inside the developing sleeve 14*a*, a magnet roller (not shown) which is a roller-shaped magnet as a magnetic field-generating means (magnetic field-generating member) is fixed and arranged so as not to rotate relative to the developing container 14*b*. The developing sleeve 14*a* carries the two-component developer and conveys it to a developing region opposing the photosensitive drum 11. Then, in the developing region, the toner is moved to and deposited on an image portion of the electrostatic image on the photosensitive drum 1 from the two-component developer on the developing sleeve 14*a*. A developing power source 74 (FIG. 2) as a developing voltage applying means (developing voltage applying portion) is connected to the developing sleeve 14*a*. The developing power source 74 applies a predetermined developing voltage (developing bias) to the developing sleeve 14*a* during the development. In this embodiment, on an exposed portion (image portion) of the photosensitive drum 11 lowered in absolute value of the potential by being exposed after being uniformly charged, the toner charged to the same polarity (negative polarity in this embodiment) as the charge polarity of the photosensitive drum 11 is deposited (reverse development type). In this embodiment, the normal charge polarity of the toner, which is a principal charge polarity of the toner during the development, is the negative polarity.

An intermediary transfer unit 20 is arranged so as to oppose the four photosensitive drums 11*y*, 11*m*, 11*c* and 11*k*. The intermediary transfer unit 20 includes the intermediary transfer belt 6 which is constituted by an endless belt as an intermediary transfer member. The intermediary transfer belt 6 is wound around, and stretched by, as a plurality of stretching rollers, a driving roller 21, a tension roller 22, and an inner secondary transfer roller 23. The intermediary transfer belt 6 is movable (rotatable) while carrying the toner image. The driving roller 21 is rotationally driven by a driving motor (not shown) as driving means, so that a driving force is transmitted to the intermediary transfer belt 6, and thus the intermediary transfer belt 6 is rotated (circulated and moved) in an arrow R2 direction (clockwise direction) in FIG. 1 at a predetermined peripheral speed corresponding to the peripheral speed of the photosensitive drum 1. The tension roller 22 controls the tension of the intermediary transfer belt 6 to be constant. The tension roller 22 is subjected to a force which pushes the intermediary transfer belt 6 from an inner peripheral surface (back surface) side toward an outer peripheral surface (front surface) side by an urging force of a tension spring (not shown) constituted by a compression coil spring which is an urging member as an urging means. By this force, a tension of about 2 to 5 kg is applied in the feeding direction (process progression direction, movement direction) of the intermediary transfer belt 6. The inner secondary transfer roller 23 constitutes a secondary transfer device 26 in combination with an outer secondary transfer roller 25 described hereinafter. On the inner peripheral surface side of the intermediary transfer belt 6, primary transfer rollers 15*y*, 15*m*, 15*c*, 15*k*, which are roller-type primary transfer members as primary transfer means, are provided correspondingly to the photosensitive drums 11*y*, 11*m*, 11*c*, 11*k*, respectively. In this embodiment, the primary transfer rollers 15 are disposed opposed to the photosensitive drums 11 and nip the intermediary transfer belt 6 between themselves and the photosensitive drums 11. Each of the primary transfer roller 15 is pressed toward the photosensitive drum 11 and contacts the photosensitive drum 11 by way of the intermediary transfer belt 6, and forms a primary transfer portion (primary transfer nip) N1 which is a contact portion between the photosensitive drum 11 and the intermediary transfer belt 6.

The toner image formed on the photosensitive drum 11 is transferred (primarily transferred) onto the intermediary transfer belt 6 in the primary transfer portion N1 by the action of the primary transfer roller 15. For example, when forming a full-color image, the yellow, magenta, cyan and black toner images formed on the photosensitive drums 11 are multiple-transferred so as to be sequentially superimposed on the intermediary transfer belt 6. A primary transfer power source 75 (FIG. 2) as a primary transfer voltage applying means (primary transfer voltage applying portion) is connected to the primary transfer roller 15. During the primary transfer, the primary transfer power supply 75 applies a primary transfer voltage (primary transfer bias) which is a DC voltage having a polarity opposite to the normal charge polarity of the toner (positive polarity in this embodiment) to the primary transfer roller 15. By this, the toner image of the negative polarity on the photosensitive drum 11 is primary transferred onto the intermediary transfer belt 6. To the primary transfer voltage source 75, a voltage detecting sensor 75*a* (FIG. 2) as a voltage detecting means (voltage detecting portion) which detects an output voltage thereof and a current detecting sensor 75*b* (FIG. 2) as a current detecting means (current detecting portion) which detects an output current thereof are connected. In this embodiment, for example, a primary transfer voltage of about 1 to 2 kV is applied to the primary transfer roller 15 ("1 to 2 kV" shows a range including 1 kV and 2 kV, and the same applies hereinafter). In addition, in this embodiment, the primary transfer voltage is subjected to constant-voltage control. In this embodiment, the primary transfer voltage sources 75*y*, 75*m*, 75*c* and 75*k* are provided independently for the primary transfer rollers 15*y*, 15*m*, 15*c* and 15*k*, respectively. Further, in this embodiment, the primary transfer voltages applied to the primary transfer rollers 15*y*, 15*m*, 15*c* and 15*k* can be individually controlled.

Here, in this embodiment, the primary transfer roller 15 has a core metal and an elastic layer of ion conductive foam rubber (NBR rubber) formed at a periphery of the core metal. An outer diameter of the primary transfer roller 15 is, for example, 15 to 20 mm. In addition, as the primary transfer roller 15, a roller having an electric resistance value of $1\times10^5$ to $1\times10^8$ Ω (N/N (23° C., 50% RH) condition, 2 kV applied) can be preferably used.

Further, in this embodiment, the intermediary transfer belt 6 is an endless belt having a two-layer structure including a base layer, and a surface layer in the order named from the inner peripheral surface side toward the outer peripheral surface side. As the material constituting the base layer, a resin such as polyimide or polycarbonate, in which an appropriate amount of carbon black is contained as an antistatic agent can be suitably used. The thickness of the base layer is, for example, 0.05 to 0.15 mm. As a material constituting the surface layer, a resin such as chloroprene rubber (CR) to which electroconductivity is imparted can be suitably used. The thickness of the surface layer is, for example, 0.200 to 0.300 mm. In this embodiment, the intermediary transfer belt 6 has a volume resistivity of $5\times10^8$ to $1\times10^{14}$ Ω·cm (23° C., 50% RH). Incidentally, in this embodiment, the two-layer structure was employed in the intermediary transfer belt 6, but a single-layer structure of a material corresponding to the material of the above-described base layer may also be employed. Further, the surface layer may also be formed as a resin-coated layer, of about 0.002 to 0.01 mm in thickness, containing a resin material such as a fluorine-containing resin. Further, the intermediary transfer belt 6 may have a multi-layer structure of three or more layers.

On the outer peripheral surface side of the intermediary transfer belt 6, the outer secondary transfer roller 25, which is a roller-type secondary transfer member as a secondary transfer means, is disposed. The outer secondary transfer roller 25 as the secondary transfer member constitutes the secondary transfer device 26 in cooperation with the inner secondary transfer roller 23 as an opposing member (opposing electrode). The outer secondary transfer roller 25 is pressed toward the inner secondary transfer roller 23, and contacts the inner secondary transfer roller 23 by way of the intermediary transfer belt 6 and forms a secondary transfer portion (secondary transfer nip) N2 which is a contact portion between the intermediary transfer belt 6 and the outer secondary transfer roller 25. The toner image formed on the intermediary transfer belt 6 is transferred (secondarily transferred) onto the recording material S, nipped and fed by the intermediary transfer belt 6 and the outer secondary transfer roller 25, by the action of the secondary transfer device 26 in the secondary transfer portion N2. To the outer secondary transfer roller 25, a secondary transfer power source 76 as a secondary transfer voltage applying means (secondary transfer voltage applying portion) (FIG. 2) is connected. During the secondary transfer, the secondary transfer power source 76 applies a secondary transfer voltage (secondary transfer bias), which is a DC voltage having a polarity (positive polarity in this embodiment) opposite to the normal charge polarity of the toner, to the outer secondary transfer roller 25. By this, the toner image of the negative polarity on the intermediary transfer belt 6 is secondarily transferred onto the recording material S. To the secondary transfer power source 76, a voltage detecting sensor 76*a* (FIG. 2) as a voltage detecting means (voltage detecting portion) for detecting the output voltage thereof and a current detecting sensor 76*b* (FIG. 2) as a current detecting means (current detecting portion) for detecting the output current thereof are connected. Further, the core metal of the inner secondary transfer roller 23 is connected to the ground potential. In this embodiment, for example, a secondary transfer voltage of about 1 to 6.5 kV is applied to the secondary transfer roller 25, and a current of about 15 to 100 μA is caused to flow through the secondary transfer portion N2, so that the toner image on the intermediary transfer belt 6 is secondarily transferred onto the recording material S. In this embodiment, the secondary transfer voltage is subjected to constant voltage control. Incidentally, a constitution in which, to the inner secondary transfer roller 23 as the secondary transfer member, the secondary transfer voltage, which is the DC voltage of the same polarity as the normal charge polarity of the toner, is applied from the secondary transfer power source 76, so that the outer secondary transfer roller 25 as the opposing member is connected to the ground potential may also be employed.

The recording material S is fed from the feeding portion 4 toward the secondary transfer portion N2 in parallel to the forming operation of the toner image onto the intermediary transfer belt 6. The recording material S is accommodated in a cassette 41 as a recording material accommodating portion of the feeding portion 4. The recording material S accommodated in the cassette 41 is separated and fed one by one from the cassette 41 by a feeding roller 42 or the like. This recording material S is conveyed by a conveying roller 43 or the like as a conveying member of the feeding portion 4 to a registration roller pair 19 as a conveying member provided on a conveying passage 44 of the recording material S. Then, this recording material S is conveyed by the registration roller pair 19 to the secondary transfer portion N2 by being timed to the toner image on the intermediary transfer belt 6. Incidentally, in FIG. 1, only one cassette 41 is illustrated, but the image forming apparatus 1 may also include a plurality of cassettes 41. Further, the feeding portion 4 may be capable of feeding the recording material S also from a recording material accommodating portion (recording material mounting portion) other than the cassette 41 such as a manual feeding tray or the like.

Here, in this embodiment, the outer secondary transfer roller 25 includes a core metal and an elastic layer of ion conductive foam rubber (NBR rubber) formed around the core metal. The outer diameter of the outer secondary transfer roller 25 is, for example, 20 to 25 mm. In addition, as the outer secondary transfer roller 25, a roller having an electric resistance value of $1\times10^5$ to $1\times10^8$ Ω (measured at N/N (23° C., 50% RH), 2 kV applied) can be preferably used.

Figure 2:
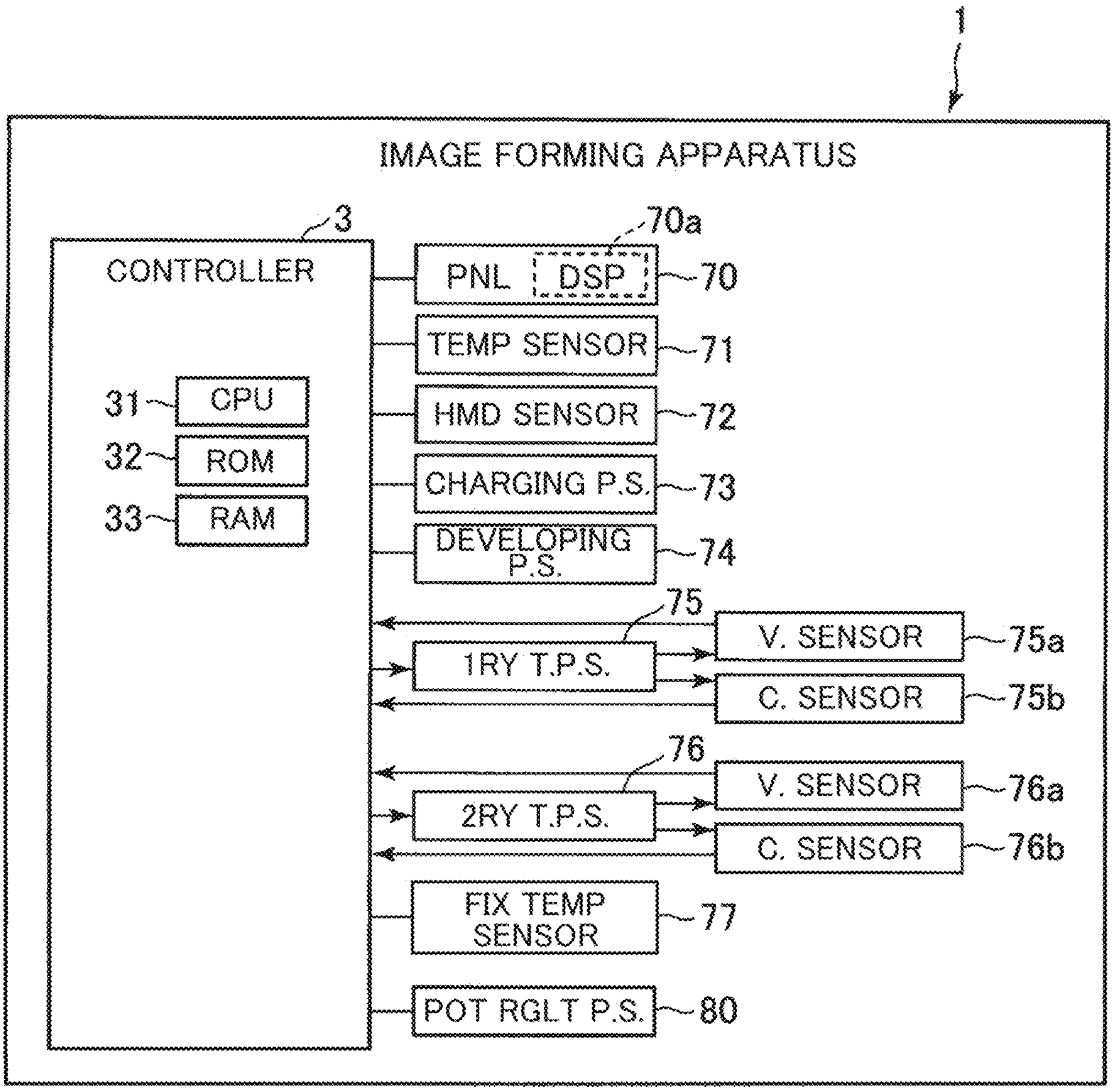
FIG. 2 is a block diagram showing a control system of the image forming apparatus.

The recording material S onto which the toner image has been transferred is fed to a fixing device 27 as a fixing means. The fixing device 27 includes a fixing roller 27*a* and a pressing roller 27*b*. The fixing roller 27*a* includes therein a heater as a heating means. The pressing roller 27*b* is press-contacted to the fixing roller 27*a* and forms a fixing portion (fixing nip). The fixing device 27 causes the recording material S carrying the unfixed toner image to be heated and pressed by nipping and feeding the recording material S between the fixing roller 27*a* and the pressing roller 27*b*, and thus causes the toner image to be fixed (melted stuck) on the recording material S. Incidentally, the temperature of the fixing roller 27*a* (fixing temperature) is detected by a fixing temperature sensor 77 (FIG. 2). The recording material S on which the toner image is fixed is fed by a discharging roller pair 51 or the like, and is discharged (outputted) through a discharge opening (not shown), onto a discharge tray 52 provided outside an apparatus main assembly 1*a* of the image forming apparatus 1.

The surface of the photosensitive drum 11 after the primary transfer is electrically discharged by the pre-exposure device 16. In addition, toner remaining on the photosensitive drum 11 without being transferred onto the intermediary transfer belt 6 during the primary transfer (primary transfer residual toner) is removed from the surface of the photosensitive drum 11 by the drum cleaning device 17 and is collected. In this embodiment, the drum cleaning device 17 scrapes off the primary transfer residual toner from the surface of the rotating photosensitive drum 11 by a cleaning blade as a cleaning member, and collects the primary transfer residual toner in a collecting (not shown). The cleaning blade is a plate-like member contacting the photosensitive drum 11 with a predetermined pressing force. The cleaning blade contacts the surface of the photosensitive drum 11 in a counter direction of the rotational direction of the photosensitive drum 11 so that a leading end thereof on a free end portion side faces the upstream side of the rotational direction of the photosensitive drum 11. Further, a deposited matter such as toner remaining on the intermediary transfer belt 6 without being transferred onto the recording material S during the secondary transfer (secondary transfer residual toner) or the like is removed and collected from the surface of the intermediary transfer belt 6 by a belt cleaning device 24 as an intermediary transfer member cleaning means.

Incidentally, the image forming unit 10 may constitute a cartridge (process cartridge) integrally detachably mountable to the apparatus main assembly 1*a* of the image forming apparatus 1. In this embodiment, the intermediary transfer unit 20 is constituted by the intermediary transfer belt 6, the stretching rollers for the intermediary transfer belt 6, the respective primary transfer rollers 15, the belt cleaning device 24, and potential regulating members 8 and the like described hereinafter. The intermediary transfer unit 20 may be integrally detachably mountable to the apparatus main assembly 1*a*.

2. Control Constitution

FIG. 2 is a block diagram showing a schematic constitution of a control system of the image forming apparatus 1 of this embodiment. The image forming apparatus 1 is provided with the controller 3 (control circuit) as a control means. The controller 3 is constituted by including a CPU 31 as a calculating means, a ROM 32 as a storing means, a RAM 33 as a storing means, and an input/output circuit (I/F) (not shown) for inputting/outputting signals between itself and the external device. The ROM 32 stores programs or the like for controlling the respective portions of the image forming apparatus 1. The RAM 33 temporarily stores data on the control. The CPU 31 is a microprocessor which controls the entire image forming apparatus 1 and is a main part of the system controller. The CPU 31 is connected to the respective portions such as the feeding portion 4, the image forming portion 2, the discharge portion 5, and the like, and not only exchanges signals with these portions, but also controls the operation of each of these portions. The ROM 32 stores an image formation control sequence for forming the image on the recording material S.

To the controller 3, the charging power source 73, the developing power source 74, the primary transfer power source 75, the secondary transfer power source 76, and a potential regulating power source 80 described hereinafter, which are controlled by signals from the controller 3, respectively, are connected. Incidentally, although omitted from illustration, in this embodiment, each of the charging power source 73, the developing power source 74, the primary transfer power source 75, and the potential regulating power source 80 is provided independently from the associated image forming unit 10. In addition, to the controller 3, the temperature sensor 71, the humidity sensor 72, the voltage detecting sensor 75*a* and the current detecting sensor 75*b* of the primary transfer voltage source 75, the voltage detecting sensor 76*a* and the current detecting sensor 76*b* of the secondary transfer voltage source 76, and the fixing temperature sensor 77, and the like are connected. A signal (information) indicating a detection result of the associated sensor is produced. Further, to the controller 3, an operating portion 70 is connected.

Then operating portion 70 includes an inputting portion constituted by an operation button (key) or the like as an input means, and a display portion 70*a* constituted by a liquid crystal panel (display) or the like as display means. Incidentally, in this embodiment, the display portion 70*a* is constituted as a touch panel, and also has a function as the input means. An operator such as a user or a service person operates the operating portion 70 and thus can cause the image forming apparatus 1 to execute a job (described later). A series of operations for forming and outputting an image on a single recording material S or images on a plurality of recording materials S by a single start instruction. The controller 3 receives the signal from the operating portion 70 and operates various devices of the image forming apparatus 1. In addition, the image forming apparatus 1 can also execute the job depending on the signal, for example, from the external device such as the personal computer, not from the operating portion 70.

3. Summary of Problem and Solution

Next, the problem in the image forming apparatus 1 of the intermediary transfer type will be further described. Incidentally, for convenience, unless otherwise mentioned, a magnitude (high/low) of a voltage and a potential refers to a magnitude (high/low) in the case where values thereof are compared with each other in terms of an absolute value. Further, as regards arrangements of the primary transfer portion N1, the photosensitive drum 11, the primary transfer roller 15, and the potential regulating member 8 described hereinafter, and the like, unless otherwise mentioned, upstream and downstream refer to upstream and downstream with respect to the feeding direction (process progression direction, movement direction) of the intermediary transfer belt 6.

As described above, in the image forming apparatus 1 of the intermediary transfer type, it is difficult to uniformly transfer the toner image on, for example, embossed paper with surface unevenness. Incidentally, the embossed paper is paper (fancy paper) provided with an uneven pattern by using a method such as swelling or stamping on the surface of the paper. Particularly, transfer of the toner image onto a recessed portion of the embossed paper requires a relatively large transfer electric field because a gap is formed between the intermediary transfer belt 6 and the embossed paper in the secondary transfer portion N2, and thus is liable to become difficult. Further, when a secondary transfer electric field is made large for improving a transfer property of the toner image onto the recessed portion of the embossed paper, in the case where the transfer electric field becomes excessively large at a portion other than the recessed portion, there is a possibility that improper transfer such that the toner is not partially transferred onto a half-tone image occurs.

When the present inventors processed with study, it was found that the toner on the intermediary transfer belt 6 is subjected to electric discharge between the intermediary transfer belt 6 and the photosensitive drum 11 on a side downstream of the primary transfer portion N1 and thus a charge amount increases. Specifically, it was found that the toner is subjected to the electric discharge and thus an average of the charge amount is increased while a toner charge amount distribution becomes broader than a toner charge amount distribution during the development. In addition, it was found that the charge amount increases as described above, and therefore, a mirror force between the toner and the intermediary transfer belt 6 increases and a transfer electric field necessary to transfer the toner onto the recording material S in the secondary transfer portion N2 becomes large, and thus it becomes further difficult to transfer the toner image onto the recessed portion of the embossed paper.

Therefore, the present inventors conducted diligent study, and found that a transfer property of the toner image onto the recording material S, such as the embossed paper, onto which transfer of the toner image is relatively difficult, can be improved by suppressing the above-described electric discharge and the increase in charge amount of the toner on the intermediary transfer belt 6. That is, it was found that in order to suppress the above-described electric discharge, application of a voltage of the same polarity as the charge polarity of the photosensitive drum 11 to the potential regulating member 8, which is an electrode member provided on an inner peripheral surface (back surface) side of the intermediary transfer belt 6 in a position downstream of the primary transfer portion N1, is effective. Particularly, it was found that the above-described electric discharge can be effectively suppressed by applying the voltage of the same polarity as the charge polarity of the photosensitive drum 11 to the potential regulating member 8 disposed in contact with the inner peripheral surface of the intermediary transfer belt 6. Incidentally, the potential regulating member 8 is disposed downstream of and adjacent to the primary transfer portion N1 so as not to contact the primary transfer roller 15 and so as not to contact the photosensitive drum 11 via the intermediary transfer belt 6.

Here, in the image forming apparatus 1, during the image forming operation (during travelling of the intermediary transfer belt 6), waving or vibration of the intermediary transfer belt 6 generates between the stretching members in some instances. This phenomenon occurs in some instances due to curling (tendency) of the intermediary transfer belt 6 by the stretching rollers or a steering operation for controlling a shift (meandering) of the intermediary transfer belt 6, or the like. Further, by such waving or vibration of the intermediary transfer belt 6, when a contact state (contact area) between the intermediary transfer belt 6 and the potential regulating member 8 is fluctuated or eliminated, the above-described electric discharge suppressing effect cannot be stably obtained. That is, there is a possibility that in-plane non-uniformity of the image occurs in an effect such that the transfer property of the toner image is improved by suppressing the above-described electric discharge. On the other hand, it was found that a contact portion of the potential regulating member 8 contacting the inner peripheral surface of the intermediary transfer belt 6 is caused to enter the photosensitive drum 11 side further than a stretching surface of the intermediary transfer belt 6 on the inner peripheral surface side at a position downstream of the primary transfer portion N1 in the case where there is no potential regulating member 8 does, and thus the potential regulating member 8 can also be further stably contacted to the intermediary transfer belt 6 during the image forming operation.

Further, according to study by the present inventors, the above-described electric discharge occurs in a range of about 0.3 to 1.5 mm from the primary transfer portion N1 toward a downstream side in many cases. On the other hand, it would be considered that by applying the voltage of the same polarity as the charge polarity of the photosensitive drum 11 to the potential regulating member 8, the above-described electric discharge can be suppressed by the action of an electric field formed in a space between the photosensitive drum 11 and the potential regulating member 8. Further, it was found that the above-described electric discharge suppressing effect is larger in the case where the potential regulating member 8 is surface-contacted to the intermediary transfer belt 6 with a width with respect to the feeding direction of the intermediary transfer belt 6 than in the case where the potential regulating member 8 is point (line) contacted to the intermediary transfer belt with respect to the feeding direction of the intermediary transfer belt 6.

Accordingly, it was found that it is preferable that the potential regulating member 8 is surface-contacted to the intermediary transfer belt 6 more stably than during the image forming operation. Here, surface contact (contact at the surface) means that the contact does not include the case where the potential regulating member 6 is contacted to the intermediary transfer belt 6 only in a line shape with respect to a direction crossing the feeding direction of the intermediary transfer belt 6 in a range narrower than a contact width (about 5 to 50 mm) described specifically hereinafter. Accordingly, the surface contact includes, for example, not only the case where a substantially entire region of the potential regulating member 8 is continuously and closely contacted to the intermediary transfer belt 6 in the contact width described specifically hereinafter but also the case where many contact points are distributed substantially uniformly in the above-described range as in the case of a nonwoven fabric or the like. In the following, description will be made further specifically.

4. Potential Regulating Member

Next, a constitution of the potential regulating member 8 in this embodiment will be described. As shown in FIG. 1, the image forming apparatus 1 of this embodiment, on sides downstream of the primary transfer portions N1*y*, N1*m*, N1*c*, and N1*k*, the potential regulating members 8*y*, 8*m*, 8*c*, and 8*k* which are electrode members are provided, respectively, in contact with the inner peripheral surface of the intermediary transfer belt 6. In this embodiment, the potential regulating members 8*y*, 8*m*, 8*c*, and 8*k* provided in the primary transfer portions N1*y*, N1*m*, N1*c*, and N1*k* have the substantially same constitution.

A shape of the potential regulating member 8 in this embodiment will be described. Part (a) of FIG. 3 is a sectional view (cross section substantially perpendicular to a rotational axis direction of the photosensitive drum 11) of the potential regulating member 8 in this embodiment. Further, part (b) of FIG. 3 is a perspective view of the potential regulating member 8 in this embodiment.

In this embodiment, the potential regulating member 8 includes a planar first portion 81 provided along a widthwise direction (direction substantially perpendicular to the feeding direction, direction substantially parallel to the rotational axis direction of the photosensitive drum 11) of the intermediary transfer belt 6. Further, in this embodiment, the potential regulating member 8 includes a planar second portion 82 provided along the widthwise direction of the intermediary transfer belt 6 and extending in a direction substantially perpendicular to a flat surface of the first portion 81. In this embodiment, a contact surface 83 of the first portion 81 of the potential regulating member 8, which is a contact portion contacting the inner peripheral surface of the intermediary transfer belt 6 is a flat surface. That is, in this embodiment, the first portion 81 constituting the contact surface 83 of the potential regulating member 8 is a flat plate.

Here, in a cross section substantially perpendicular to the rotational axis direction of the photosensitive drum 11, an upstream-side end portion of the contact surface 83 is defined as "A (or upstream end A)", and a downstream-side end portion of the contact surface 83 is defined as "B (or downstream end B)". In this embodiment, the upstream end A of the contact surface 83 corresponds to an upstream-side end portion of the potential regulating member 8, and the downstream end B of the contact surface 83 corresponds to a downstream-side end portion of the potential regulating member 8. As described above, by the action of the electric field formed in the sponge between the photosensitive drum 11 and the potential regulating member 8, in order to more effectively suppress the electric discharge between the intermediary transfer belt 6 and the photosensitive drum 11, the potential regulating member 8 may preferably be surface-contacted to the intermediary transfer belt 6. From this viewpoint, a length of a line segment AB (between A and B), i.e., a "contact width" which is a length of the contact surface 83 in the feeding direction of the intermediary transfer belt 6 may preferably be 5 mm or more. With a longer length of the line segment AB, the above-described effect of suppressing the electric field becomes larger, but it would be considered that when the length becomes excessively long, stable contact of the potential regulating member 8 with the intermediary transfer belt 6 becomes difficult by the influence of (component) part accuracy or the like.

The length of the line segment AB is insufficient in many cases when the length is 50 mm or less, and typically is 30 mm or less. That is, the length of the line segment AB may suitably be about 5 to 50 mm, typically about 5 to 30 mm. From another viewpoint, it can be said that the length of the line segment AB is enough to be not more than a half of a center distance between adjacent photosensitive drums 11 in a cross section substantially perpendicular to the rotational axis direction of the photosensitive drum 11 in many cases. In this embodiment, the potential regulating member 8 which is 25 mm in length of the line segment AB is used. Incidentally, in this embodiment, the center distance between the photosensitive drums 11 in the cross section substantially perpendicular to the rotational axis direction of the photosensitive drum 11 is about 100 mm.

To the potential regulating member 8, the potential regulating power source 80 as a potential regulating voltage applying means (potential regulating voltage applying portion) is connected. In this embodiment, to the second portion 82 of the potential regulating member 8, the potential regulating power source 80 is connected. At least at the time of the primary transfer during the image forming operation, to the potential regulating member 8, a potential regulating voltage (potential regulating bias) which is a DC voltage of the same polarity as the charge polarity of the photosensitive drum 11 is applied by the potential regulating power source 80. The time of the primary transfer is specifically a period in which the primary transfer voltage is applied, more specifically, a period in which an image region (region onto which the toner image is capable of being transferred) on the intermediary transfer belt 6 passes through the primary transfer portion N1. By this, it is possible to suppress the electric discharge between the intermediary transfer belt 6 and the photosensitive drum 11 on a side downstream of the primary transfer portion N1. In this embodiment, the potential regulating voltage is a DC voltage of a negative polarity. Further, in the constitution of this embodiment, the potential regulating voltage may preferably be about −500 to −5000 V, more preferably be −1000 to −3000 V.

The potential regulating member 8 is a member long in the widthwise direction of the intermediary transfer belt 6. A length of the contact surface 83 of the potential regulating member 8 in a longitudinal direction (direction along the widthwise direction of the intermediary transfer belt 6 may preferably be longer than a maximum image width in the widthwise direction of the intermediary transfer belt 6. Incidentally, the maximum image width is a length of an image region of a maximum image capable of being formed by the image forming apparatus 1 with respect to the widthwise direction of the intermediary transfer belt 6. In this embodiment, the length of the contact surface 83 of the potential regulating member 8 in the longitudinal direction is longer than the above-described maximum image width and a width in which the primary transfer roller 15 contacts the intermediary transfer belt 6 with respect to the widthwise direction of the intermediary transfer belt 6. That is, in this embodiment, each of a range of the maximum image width and a range in which the primary transfer roller 15 contacts the intermediary transfer belt 6 with respect to the widthwise direction of the intermediary transfer belt 6 falls inside a range of the length of the contact surface 83 of the potential regulating member 8 in the longitudinal direction.

By this, irrespective of a length of the toner image, transferred onto the intermediary transfer belt 6, with respect to the widthwise direction of the intermediary transfer belt 6, it is possible to obtain an effect of suppressing an increase in charge amount of the toner on the intermediary transfer belt 6 by suppressing the above-described electric charge. On the other hand, in this embodiment, the length of the potential regulating member 8 in the longitudinal direction is shorter than the width of the intermediary transfer belt 6. That is, in this embodiment, the range of the length of the potential regulating member 8 in the longitudinal direction falls inside the range of the width of the intermediary transfer belt 6. By this, in the case where an end portion of the potential regulating member 8 with respect to the longitudinal direction protrudes further than an end portion of the intermediary transfer belt 6 with respect to the widthwise direction does, electric discharge to the potential regulating member 8 and a member around the intermediary transfer belt 6, and the like occurs, so that a possibility that the effect of suppressing the electrical discharge becomes small can be reduced.

The potential regulating member 8 can be constituted only by, for example, a single material having electroconductivity. In this embodiment, the potential regulating member 8 is constituted substantially only of metal having electroconductivity, such as SUS (stainless steel). Specifically, in this embodiment, the potential regulating member 8 is constituted by forming the first portion 81 and the second portion 82 by subjecting a plate material made of metal (metal plate) such as SUS to bending. By thus subjecting the metal plate to the bending, strength of the potential regulating member 8 can be increased. In this embodiment, each of the first portion 81 and the second portion 82 of the potential regulating member 8 is not substantially deformed in a use state of the image forming apparatus 1. However, the present invention is not limited to such an embodiment, but the potential regulating member 8 may also be constituted by two or more materials.

FIG. 4 is a sectional view (cross section substantially perpendicular to the rotational axis direction of the photosensitive drum 11) in another example of the potential regulating member 8. For example, as shown in FIG. 4, a constitution in which a base portion 84 having a shape similar to the shape of the potential regulating member 8 shown in FIG. 3 and a surface layer 85 formed on the base portion 84 are provided can be employed. The contact surface 83 contacting the intermediary transfer belt 6 and the surface layer 85 constituting a connecting portion with the potential regulating power source 80 are formed of an electroconductive material such as metal or an electroconductive resin material. The base portion 84 may be formed of the electroconductive material, but may also be formed of a non-electroconductive material such as a non-electroconductive resin material. The base portion 84 and the surface layer 85 can be fixed by an arbitrary fixing means such as an adhesive or welding.

Further, FIG. 5 is a sectional view (cross section substantially perpendicular to the rotational axis direction of the photosensitive drum 11) in still another example of the potential regulating member 8. For example, as shown in FIG. 5, the contact surface 83 of the potential regulating member 8 contacting the intermediary transfer belt 6 may also be formed of an electroconductive nonwoven fabric 86. Incidentally, in FIG. 5, the electroconductive nonwoven fabric 86 is provided on the contact surface 83 of the potential regulating member 8 having the constitution shown in FIG. 4, but the electroconductive nonwoven fabric 86 may also be provided on the contact surface 83 of the potential regulating member 8 having the constitution shown in FIG. 3. The electroconductive nonwoven fabric 86 can be fixed by an arbitrary fixing means such as an electroconductive adhesive. Further, instead of the nonwoven fabric 86, a felt, a pile fabric (out pile fabric (velvet, brush) or loop pile fabric (towelling)) which are constituted using electroconductive fibers, or a sponge (elastic foam member) constituted using an electroconductive rubber material may also be used. Thus, the contact surface 83 of the potential regulating member 8 contacting the intermediary transfer belt 6 is constituted by a flexible material or an elastic material, so that it is possible to reduce a possibility of an occurrence of scars on an inner peripheral surface of the intermediary transfer belt 6 caused by friction (slide) between the inner peripheral surface of the intermediary transfer belt 6 and the potential regulating member 8.

5. Arrangement of Potential Regulating Member

Next, an arrangement of the potential regulating member 8 in this embodiment will be described. FIG. 6 is a sectional view (cross section substantially perpendicular to the rotational axis direction of the photosensitive drum 11) for illustrating the arrangement of the potential regulating member 8 provided between two primary transfer portions N1 adjacent to each other in the feeding direction of the intermediary transfer belt 6. In FIG. 6, as an example, a potential regulating member 8*c* provided between the primary transfer portions N1*c* for cyan and N1*k* for black is shown (the same applies hereinafter for FIGS. 7, 10, 11, and 12).

In this embodiment, an outer diameter of the photosensitive drum 11 is 30 mm, an outer diameter of the primary transfer roller 15 is 18 mm, and a thickness of the intermediary transfer belt 6 is 0.350 mm. Further, in this embodiment, the primary transfer roller 15 is offset toward a downstream side relative to the photosensitive drum 11. In this embodiment, an offset amount X1 is 3 mm. Incidentally, the offset amount X1 is a distance between a rotation center of the photosensitive drum 11 and a rotation center of an associated primary transfer roller 15 in a direction along a common tangential line on a side where a plurality of photosensitive drums 15 contact the intermediary transfer belt 6 in a cross section substantially perpendicular to the rotational axis direction of the photosensitive drum 11.

Here, in order to illustrate the arrangement of the potential regulating member 8, the case where the potential regulating member 8 is removed is assumed. In the cross section substantially perpendicular to the rotational axis direction of the photosensitive drum 11, a rectilinear line along which a stretching surface of the intermediary transfer belt on an inner peripheral surface side in a portion downstream of the primary transfer portion N1 passes in the case where there is no potential regulating member 8 is defined as a rectilinear line L. Incidentally, specifically, this rectilinear line L corresponds to the stretching surface in a state in which only the potential regulating member 8 is substantially removed from the constitution of the image forming apparatus 1 in a state during the image forming operation (however, the photosensitive drum 11 and the intermediary transfer belt 6 are at rest). For example, the rectilinear line L between the photosensitive drum 11*c* and the photosensitive drum 11*k* can be regarded as a common tangential line (on the intermediary transfer belt 6 side) of the primary transfer roller 15*c* of an upstream station and the photosensitive drum 11*k* of a downstream station (strictly, in the case where the primary transfer roller 15 has an elastic layer as in the case of a sponge roller, the primary transfer roller 15 is deformed, but this influence is to a negligible degree). Further, on the rectilinear line L, a portion where the inner peripheral surface of the intermediary transfer belt 6 is separated from a closest stretching member on an upstream side of the potential regulating member 8 is defined as "C (or upstream stretching portion C)", and a portion where the inner peripheral surface of the intermediary transfer belt 6 is separated from a closest stretching member on a downstream side of the potential regulating member 8 is defined as "D (or downstream stretching portion D)". Incidentally, in FIG. 6, the rectilinear line L is schematically shown substantially horizontally, but in the case where the surface of the primary transfer roller 15 is raised toward the photosensitive drum 11 side by deformation or the like of the elastic layer of the primary transfer roller 15, the rectilinear line L may be inclined downward toward the downstream side in the figure.

In this embodiment, the closest stretching member on the upstream side of the potential regulating member 8 is the primary transfer roller 15, and a position on the inner peripheral surface of the intermediary transfer belt 6 at a portion where the intermediary transfer belt 6 is separated from the primary transfer roller 15 is the upstream stretching portion C. However, the closest stretching member on the upstream side of the potential regulating member 8 is not limited to the primary transfer member 15. For example, as shown in FIG. 7, in the case where the primary transfer roller 15 is offset and disposed on an upstream side relative to the photosensitive drum 11, a position on the inner peripheral surface of the intermediary transfer belt 6 at a portion corresponding to a portion where the intermediary transfer belt 6 is separated from the photosensitive drum 11 is the upstream stretching portion C. Incidentally, FIG. 7 is a sectional view similar to FIG. 6 in the case where the primary transfer roller 15 is offset and disposed on the upstream side relative to the photosensitive drum 11.

Further, in this embodiment, the closest stretching member on the downstream side of the potential regulating member 8 is the corresponding one of the photosensitive drums 11*m*, 11*c*, and 11*k* disposed adjacent to the potential regulating member 8 on the downstream side of the potential regulating member 8 for the primary transfer portions N1*y*, N1*m*, and N1*c*, respectively, for yellow, magenta, and cyan. Further, a position on the inner peripheral surface of the intermediary transfer belt 6 at a portion corresponding to a portion where the intermediary transfer belt 6 is separated from an associated one of the photosensitive drums 11*m*, 11*c*, and 11*k* is the downstream stretching portion D. However, the closest stretching member on the downstream side of the potential regulating member 8 is not limited to the photosensitive drum 11. For example, as shown in FIG. 7, in the case where the primary transfer roller 15 is offset and disposed on the upstream side relative to the photosensitive drum 11, a position on the inner peripheral surface of the intermediary transfer belt 6 at a portion where the intermediary transfer belt 6 is separated from the primary transfer roller 15 is the downstream stretching portion D. Further, in this embodiment, for the most downstream primary transfer portion N1*k* for black, as shown in FIG. 8, the closest stretching member on the downstream side thereof is the stretching roller (tension roller in this embodiment) 22. Further, a position on the inner peripheral surface of the intermediary transfer belt 6 at a portion where the intermediary transfer belt 6 is separated from the stretching roller 22 is the downstream stretching portion D. Incidentally, FIG. 8 is a sectional view similar to FIG. 6 relating to the potential regulating member 8 provided for the most downstream primary transfer portion N1*k*.

Further, for each of the primary transfer portions N1, as the closest stretching member on the downstream side of the potential regulating member 8, in the case where there is another stretching roller for regulating an attitude of the intermediary transfer belt 6 during the image forming operation, the rectilinear line L and the downstream stretching portion D are defined on the basis of its stretching roller. Further, in the case where not the stretching roller, a scraper or a brush is contacted to the inner peripheral surface of the intermediary transfer belt 6 for the purpose of cleaning the inner peripheral surface of the intermediary transfer belt 6 or for the like purpose, the scraper or the brush can be regarded as the closest stretching member on the downstream side of the potential regulating member 8 when the scraper or the brush regulates the attitude of the intermediary transfer belt 6. The scraper is constituted by a sheet-like or film-like member in general.

As shown in FIG. 6, the potential regulating member 8 is disposed downstream of and close to the primary transfer portion N1 so as not to contact the primary transfer roller 15 and the photosensitive drum 11 via the intermediary transfer belt 6. At this time, as the upstream end A is closer to the primary transfer portion N1, the above-described electric charge suppressing effect becomes larger. In this embodiment (FIG. 6), the potential regulating member 8 is disposed in a position downstream of the primary transfer portion N1 so that a distance X2 from the primary transfer roller 15 to the upstream end A becomes about 8 mm. Here, the distance X2 is a distance between the rotation center of the primary transfer roller 15 and the upstream end A in a direction along the common tangential line on a side where the plurality of photosensitive drums 11 contact the intermediary transfer belt 6 in the cross section substantially perpendicular to the rotational axis direction of the photosensitive drum 11. That is, in this embodiment, the distance from the rotation center of the primary transfer roller 15 to the upstream end A is shorter than a distance (radius) from the rotation center of the primary transfer roller 15 to an outer circumference of the primary transfer roller 15. The distance X2 is not limited thereto, but may preferably be about 1 to 20 mm, typically about 1 to 10 mm.

Further, in this embodiment, the potential regulating member 8 is pressed against the inner peripheral surface of the intermediary transfer belt 6 by a pressing spring 87 (part (b) of FIG. 3) constituted by a compression coil spring which is an urging member as an urging means at each of opposing end portions thereof with respect to the longitudinal direction thereof. At this time, the contact portion of the potential regulating member 8 contacting the inner peripheral surface of the intermediary transfer belt 6 is caused to enter the photosensitive drum 11 side relative to the rectilinear line L. By this, even in the case where waving or vibration occurs on the intermediary transfer belt 6 during the image forming operation (during traveling of the intermediary transfer belt 6), the potential regulating member 8 can be more stably contacted to the intermediary transfer belt 6. Although the potential regulating member 8 is not limited thereto, an entering amount of the contact surface 83 of the potential regulating member 8 into the rectilinear line L may preferably be about 0.3 to 5 mm, typically about 0.5 to 3 mm (for example, about 0.5 mm). When this entering amount is excessively small, there is a possibility that the potential regulating member 8 cannot be stably contacted to the intermediary transfer belt 6. When the entering amount is excessively large, there is a possibility that stable feeding (conveyance) of the intermediary transfer belt 6 becomes difficult.

Particularly, in this embodiment, a pressing force of the pressing spring 87 is set (adjusted) so that each of the upstream end A and the downstream end B of the contact surface 83 which is a contact portion of the potential regulating member 8 contacting the inner peripheral surface of the intermediary transfer belt 6 is caused to enter the photosensitive drum 11 side in the following entering amount into the rectilinear line L. In this embodiment, as described above, the primary transfer roller 15 is disposed so as to effect toward a side downstream of the photosensitive drum 11. Parts (a) and (b) of FIG. 9 are sectional views (cross sections substantially perpendicular to the rotational axis direction of the photosensitive drum 11) each showing a neighborhood of a single primary transfer portion N1 in an enlarged state in order to illustrate the entering amount of the contact surface 83 of the potential regulating member 8 into the rectilinear line L. Here, in the cross section substantially perpendicular to the rotational axis direction of the photosensitive drum 1, a rectilinear line which passes through an intersection point between the rectilinear line L and a rectilinear line P connecting rotation axis center of the photosensitive drum 11 and a rotation axis center of the primary transfer roller 15 and which is perpendicular to the rectilinear line P is defined as a nip line Q. Here, the intersection point between the rectilinear line L and the rectilinear line P can be substantially regarded as an intersection point between the rectilinear line P and the photosensitive drum 11. For this reason, the nip line Q may be regarded as a rectilinear line which passes through the intersection point (nip) between the rectilinear line P and the photosensitive drum 1 and which is perpendicular to the rectilinear line P. In this embodiment, the upstream end A and the downstream end B of the contact surface 83 which is a contact portion of the potential regulating member 8 contacting the inner peripheral surface of the intermediary transfer belt 6 are caused to enter the photosensitive drum 11 side relative to the rectilinear line P but are not caused to enter into the nip line Q (part (a) of FIG. 9). That is, the contact surface 83 of the potential regulating member 8 is positioned on the photosensitive drum 11 side relative to the rectilinear line L and is positioned on the primary transfer roller 15 side relative to the nip line Q. When the contact surface 83 of the potential regulating member 8 is caused to enter the photosensitive drum 11 side relative to the nip line Q, the intermediary transfer belt 6 becomes a shape such that the intermediary transfer belt 6 is wound about the photosensitive drum 11 (part (b) of FIG. 9). In this case, a minute gap region between the photosensitive drum 1 and the intermediary transfer belt 6 is enlarged, so that an amount of the electric discharge increases. That is, in this case, relative to a distance from the primary transfer portion N1 on the side downstream of the primary transfer portion N1, a distance between the photosensitive drum 11 and the intermediary transfer belt 6 does not readily increase, so that a region in which the electric discharge between the photosensitive drum 11 and the intermediary transfer belt 6 can occur increases. This electric discharge increases the charge amount of the toner on the intermediary transfer belt 6, so that the secondary transfer is worsened as described above. The entering amount of the potential regulating member 8 into the rectilinear line L may preferably be 5% or more and 800% or less, more preferably be 10% or more and 50% or less, and is 30% in this embodiment when the case where the potential regulating member 8 is caused to enter into the nip line Q is taken as 100%.

The above-described description can also be paraphrased as follows. That is, in the cross section substantially perpendicular to the rotational axis direction of the photosensitive drum 11, a direction along the common tangential line on the side where the plurality of photosensitive drums 11 contact the intermediary transfer belt 6 is referred to as a perpendicular direction. At this time, with respect to this perpendicular direction, an entering rate of the contact surface 83 of the potential regulating member 8 from the rectilinear line L to the rectilinear line Q may preferably be 5% or more to 80% or less, more preferably 10% or more and 50% or less, and is 30% in this embodiment.

Here, in the cross section substantially perpendicular to the rotational axis direction of the photosensitive drum 11, a rectilinear line passing through the upstream end A and the downstream end B of the contact surface 83 is defined as a rectilinear line M. At this time, it is preferable that the rectilinear line M is prevented from crossing a line segment CD of the rectilinear line. By this, in the case where the contact surface 83 of the potential regulating member 8 is a flat surface, the intermediary transfer belt 6 and the potential regulating member 8 can be surface-contacted to each other more reliably. As shown in FIG. 10 or FIG. 11, in the case where the rectilinear line M crosses the line segment CD of the rectilinear line L, there is a possibility that only either one of an end portion of the potential regulating member 8 on the upstream end A side (FIG. 11) and an end portion of the potential regulating member 8 on the downstream end B side (FIG. 10) can contact the inner peripheral surface of the intermediary transfer belt 6. In this case, there is a possibility that it becomes difficult to enhance the electric discharge suppressing effect by the surface contact. Incidentally, each of FIGS. 10 and 11 is a sectional view similar to FIG. 6 in the case where the rectilinear line M crosses the line segment CD of the rectilinear line L. FIG. 10 shows the case where the rectilinear line M is inclined relative to the rectilinear line L so that the upstream end A side is closer to the rectilinear line L than the downstream end B side is, and FIG. 11 shows the case where the rectilinear line M is inclined relative to the rectilinear line L so that the downstream end B side is closer to the rectilinear line L than the upstream end A side is.

Further, in FIG. 6, the potential regulating member 8 is disposed so that the rectilinear line M and the rectilinear line L are substantially parallel to each other, but when the rectilinear line M falls within a range in which the rectilinear line M does not cross the line segment CD of the rectilinear line L, the potential regulating member 8 may be disposed so that the rectilinear line M is inclined relative to the rectilinear line L. Particularly, as shown in FIG. 12, the rectilinear line M is inclined relative to the rectilinear line L so that the upstream end A side is closer to the rectilinear line L than the downstream end B side, so that curvature generated on the intermediary transfer belt 6 due to laying of the intermediary transfer belt 6 in the neighborhood of the upstream end A can be made small. Accordingly, this case is advantageous for reduction in possibility of an occurrence of scars on the inner peripheral surface of the intermediary transfer belt 6 due to friction (slide) with the potential regulating member 8.

6. Effect Confirmation

Next, a result of verification of an effect of this embodiment will be described. The verification was conducted in terms of two points that an increase in charge amount of the toner can be suppressed and that a transfer property of the toner into the embossed paper is improved.

Specifically, the following experiment was conducted. In the image forming apparatus 1 according to this embodiment, a width of the primary transfer point N1 (i.e., a length of the intermediary transfer belt 6 in the widthwise direction) was 330 mm, and a width of the secondary transfer portion N2 (i.e., the length of the intermediary transfer belt 6 in the widthwise direction) was 340 mm. Further, the image forming apparatus 1 was operated at a process speed (peripheral speed of the photosensitive drum 11) of 180 mm/s. Then, an A4-size slid image was formed on the photosensitive drum 11*c*, and the toner image was primarily transferred onto the intermediary transfer belt 6 in the primary transfer portion N1*c* for cyan. Thereafter, the toner image was conveyed on the intermediary transfer belt 6 and was passed through the primary transfer portion N1*k* for black, and then was secondarily transferred onto the embossed paper in the secondary transfer portion N2. The primary transfer voltage was subjected to constant-voltage control by the controller 3 with a voltage set so that a primary transfer current in the primary transfer portion N1 becomes 20 μA which is a target current. In addition, the secondary transfer voltage was subjected to constant-voltage control by the controller 3 with a voltage set so that a secondary transfer current in the secondary transfer portion N2 becomes 30 μA which is a target current.

The above-described operation was performed in a state in which the potential regulating members 8 (8*c*, 8*k*) are dismounted ("WITHOUT POTENTIAL REGULATING MEMBER") and in a state in which in accordance with this embodiment, the potential regulating members 8 (8*c*, 8*k*) are mounted and to which a potential regulating voltage of −3000 V is applied by the potential regulating power source 80 ("WITH POTENTIAL REGULATING MEMBER"). As the embossed paper, "Rezak 66" (trade name, manufactured by Tokushu Tokai Paper Co., Ltd.) with a basis weight of 302 g/cm$^2$ was used. Then, a change in charge amount of the toner in each of the case of "WITH POTENTIAL REGULATING MEMBER" and the case of "WITHOUT POTEN- TIAL REGULATING MEMBER” was measured. Incidentally, the charge amount of the toner was calculated by measuring an electric charge per unit weight (mass) by a general suction method in this field. This method calculates a charge amount [μC/g] by measuring a weight [g] and an electric charge amount [μC] of sucked toner, and thus is capable of grasping an average charge amount of the toner. Further, images on the above-described embossed paper after fixing in the case where the potential regulating member is present (“WITH POTENTIAL REGULATING MEMBER”) and the case where the potential regulating member is absent “WITHOUT POTENTIAL REGULATING MEMBER”) were compared with each other.

FIG. 13 is a graph showing a result of measurement of a change in charge amount of the toner in each of the case where the potential regulating member is present and in the case where the potential regulating member is absent. As shown in FIG. 13, the charge amount of the toner on the photosensitive drum 11*c* for cyan was −23 μC/g. On the basis of this charge amount of the toner, the change in charge amount of the toner in each of the following states was measured. First, a charge amount of the toner on the intermediary transfer belt 6 after the primary transfer in the primary transfer portion N1*c* for cyan and before arrival at the primary transfer portion N1*k* for black (“ON BELT AFTER CYAN 1RY TRANSFER (N1*c*)”) was measured. Further, a charge amount of the toner on the intermediary transfer belt 6 after passing through the primary transfer portion N1*k* for black and before arrival at the secondary transfer portion N2 (“ON BELT AFTER BLACK 1RY TRANSFER (N1*k*)”) was measured. As a result thereof, it was found that although the charge amount of the toner increases (absolute value thereof becomes large) in both of the case where the potential regulating member is present and the case where the potential regulating member is absent, the increase in charge amount of the toner can be better suppressed in the case where the potential regulating member is present than in the case where the potential regulating member is absent.

Parts (a) and (b) of FIG. 14 are photographic views showing images on embossed paper after fixing in a comparison manner in the case where the potential regulating member is absent and in the case where the potential regulating member is present, respectively. Part (a) of FIG. 14 shows the image in the case where the potential regulating member is absent, and part (b) of FIG. 14 shows the image in the case where the potential regulating member is present. As shown in part (a) of FIG. 14, in the case where the potential regulating member is absent, the toner cannot be transferred onto a recessed portion of a surface of the embossed paper, so that white dropout is conspicuous in some instances. On the other hand, as shown in part (b) of FIG. 14, in the case where the potential regulating member is present, it was found that the toner can be sufficiently transferred onto the recessed portion of the surface of the embossed paper, so that transfer of the toner image can be carried out more uniformly. That is, in the case where the potential regulating member is present, the transfer property of the toner image onto the recessed portion of the embossed paper can be improved while reducing a possibility that improper transfer is caused to occur on a half-tone image at a portion other than the recessed portion of the embossed paper by a secondary transfer electric field made excessively large.

Incidentally, as is understood from FIG. 13, there is a possibility that the toner on the intermediary transfer belt 6 is subjected to the electric discharge between the intermediary transfer belt 6 and the photosensitive drum 11 on a side downstream of the primary transfer portion N1 every time when the toner passes through the primary transfer portion N1 and thus the charge amount increases. For that reason, the toner transferred onto the intermediary transfer belt 6 in an upstream-side primary transfer portion N1 is larger in the number of times of passing of the toner through the downstream-side primary transfer portion(s) N1, so that it can be said that the charge amount is more liable to increase. Accordingly, in this embodiment, the potential regulating member 8 is provided for all four primary transfer portions N1, but the potential regulating member 8 may also be provided only for a single or a plurality of upstream primary transfer portions N1 without being provided for all four primary transfer portions N1. For example, the potential regulating member 8 can be provided only for the most upstream primary transfer portion N1*y* or only for the most upstream primary transfer portion N1*y* and the primary transfer portion N1*m* (and further the primary transfer portion N1*c*) adjacent to the primary transfer portion N1*y* on the downstream side.

Further, FIG. 15 is a graph for illustrating an effect by entrance of the potential regulating member 8 into the stretching surface of the intermediary transfer belt 6 and an effect by surface-contact of the potential regulating member 8 with the intermediary transfer belt 6. Specifically, FIG. 15 shows a simulation result in the following condition. As the potential regulating member 8, a test potential regulating member 8 constituted by a flat plate similar to the first portion 81 of the potential regulating member 8 in this embodiment was assumed. Further, an index of an electric discharge amount between the intermediary transfer belt 6 and the photosensitive drum 11 on a side downstream of the primary transfer portion N1 in each of the following cases (1) to (4) was compared with each other.

(1) Case that an end portion corresponding to the upstream end A is brought near to the inner peripheral surface of the intermediary transfer belt 6 in a point (line) shape (separated by about 0.4 mm) (arrangement of the potential regulating member 8 relative to the intermediary transfer belt 6 with an angle).

(2) Case that a portion from an end portion corresponding to the upstream end A to an end portion corresponding to the downstream end B is brought near to the intermediary transfer belt 6 in a planar shape (separated by about 0.4 mm).

(3) Case that an end portion corresponding to the upstream end A is contacted to the inner peripheral surface of the intermediary transfer belt 6 in a point (line) shape (arrangement of the potential regulating member 8 relative to the intermediary transfer belt 6 with an angle).

(4) Case that a portion from an end portion corresponding to the upstream end A to an end portion corresponding to the downstream end B is contacted to the intermediary transfer belt 6 in a planar shape.

Incidentally, as the index of the electric discharge amount, a width (distance from the primary transfer portion N1) of the intermediary transfer belt 6 with respect to the feeding direction in a region where the electric discharge in a position downstream of the primary transfer portion N1 occurs in the case where a predetermined primary transfer voltage is applied to the primary transfer roller 15 was used. With a larger width of the region where the electric discharge occurs, the electric discharge amount between the intermediary transfer belt 6 and the photosensitive drum 11 in the position downstream of the primary transfer portion N1 becomes larger, so that it can be said that a possibility of an increase in charge amount of the toner increases. Further, the case where the potential regulating member 8 is in non-contact with the intermediary transfer belt 6 as in the above-described cases (1) and (2) is the case simulating the case where waving or vibration occurs on the intermediary transfer belt 6 during the image forming operation (during traveling of the intermediary transfer belt 6) and thus the potential regulating member 8 is separated from the intermediary transfer belt 6. Incidentally, as regards the constitution of the photosensitive drum 11, the intermediary transfer belt 6, and the primary transfer roller 15 and the condition of the primary transfer voltage, the case similar to those in the image forming apparatus 1 of this embodiment was assumed. In FIG. 15, the ordinate represents the above-described electric discharge amount, and the abscissa represents a potential regulating voltage. Further, "REF" in FIG. 15 shows the case where the potential regulating member 8 was not provided.

As shown in FIG. 15, when the potential regulating member 8 is separated from the intermediary transfer belt 6 (the above-described (1) and (2)), the above-described effect of suppressing the electric discharge becomes small. That is, it is understood that the potential regulating member 8 is caused to enter the intermediary transfer belt 6 further than the stretching surface does, and is stably contacted to the intermediary transfer belt 6 also during the image forming operation (during traveling of the intermediary transfer belt 6) (the above-described (3) and (4)), and thus the above-described effect of suppressing the electric discharge can be stably obtained. Further, as shown in FIG. 15, it is understood that a corresponding effect can also be obtained in the case where the potential regulating member 8 is point (line)-contacted to the intermediary transfer belt 6. However, as shown in FIG. 15, it is understood that the effect of suppressing the electric discharge is larger in the case where the potential regulating member 8 is surface-contacted to the intermediary transfer belt 6 than in the case where the potential regulating member 8 is point (line)-contacted to the intermediary transfer belt 6. Further, as shown in FIG. 15, it is understood that there is a tendency that the effect of suppressing the electric discharge becomes larger by increasing the potential regulating voltage (by making an absolute value thereof large) of the same polarity as the charge polarity of the photosensitive drum 11. As described above, in the constitution of this embodiment, the potential regulating voltage may preferably be about −1000 to −3000 V.

Thus, in this embodiment, the image forming apparatus 1 includes the photosensitive member 11 chargeable to a predetermined polarity and carrying the toner image, the circumferentially movable intermediary transfer belt 6 which is stretched by the plurality of stretching rollers and which conveys the toner image for secondarily transferring the toner image, primarily transferred from the photosensitive member 11 in the primary transfer portion N1, onto the recording materials in the secondary transfer portion N2, the primary transfer member 15 which is provided correspondingly to the photosensitive member 11 and which forms the primary transfer portion N1 where the photosensitive member 11 and the intermediary transfer belt 6 contact each other in contact with the inner peripheral surface of the intermediary transfer belt 6 and where the toner image is transferred from the photosensitive member 11 onto the intermediary transfer belt 6 under application of the voltage, the electrode member 8 contacting the inner peripheral surface of the intermediary transfer belt 6 immediately close to the downstream side of the primary transfer member 15 with respect to the movement direction of the intermediary transfer belt 6, and the power source 80 for applying the voltage of the same polarity as the predetermined polarity to the electrode member 8, wherein the electrode member 8 is disposed so that the contact portion 83 thereof contacting the inner peripheral surface of the intermediary transfer belt 6 enters the photosensitive member side relative to the stretching surface on the inner peripheral surface side of the intermediary transfer belt 6 on the side downstream of the primary transfer portion N1 in the case where the electrode member 8 is absent. In this embodiment, in the cross section substantially perpendicular to the widthwise direction of the intermediary transfer belt 6, when the rectilinear line which passes through the intersection point between the rectilinear line P connecting the rotation axis center of the rotatable photosensitive member 1 and the rotation axis center of the rotatable primary transfer member 15 and the rectilinear line L along which the inner peripheral surface-side stretching surface of the intermediary transfer belt 6 on the side downstream of the primary transfer portion N1 in the case where the electrode member 8 is absent and which is perpendicular to the rectilinear line P is the nip line Q, the contact portion 83 is further on the photosensitive member side than the rectilinear line L is, and is further on the primary transfer member side than the nip line Q is. In this embodiment, the contact portion 83 surface-contacts the inner peripheral surface of the intermediary transfer belt 6. Further, in this embodiment, the contact surface 83 is the flat surface. Here, in a preferred form, in the cross section substantially perpendicular to the widthwise direction of the intermediary transfer belt 6, when the inner peripheral surface-side stretching surface of the intermediary transfer belt 6 on the side downstream of the primary transfer portion N1 in the case where the electrode member 8 is absent in the rectilinear line L, the upstream-side end portion of the contact portion 83 with respect to the movement direction is the upstream end A, the downstream-side end portion of the contact portion 83 with respect to the movement direction is the downstream end B, the position where the attitude of the intermediary transfer belt 6 immediately close to the upstream side of the electrode member 8 with respect to the movement direction on the rectilinear line L is regulated in the upstream stretching portion C, the position where the attitude of the intermediary transfer belt 6 immediately close to the downstream side of the electrode member with respect to the movement direction on the rectilinear line L is regulated is the downstream stretching portion D, and the rectilinear line passing through the upstream end A and the downstream end B is the rectilinear line M, the electrode member 8 is disposed so as that the rectilinear line member does not cross the line segment CD on the rectilinear line L. In a preferred form, the length of the contact portion 83 in the movement direction is 5 mm or more and 50 mm or less. Further, in a preferred form, the image forming apparatus 1 includes the plurality of drum-shaped photosensitive members 11, and the length of the contact portion 83 in the movement direction is not more than the half of the center (inter-axial) distance between the adjacent photosensitive members 11 in the cross section substantially perpendicular to the widthwise direction of the intermediary transfer belt 6. In this embodiment, the contact portion 83 is constituted by the electroconductive material. Particularly, in this embodiment, the contact portion 83 is constituted by the electroconductive metal. However, the contact portion 83 may also be constituted by the electroconductive fibers, for example. Further, the image forming apparatus 1 can have a constitution including the rectilinear line of photosensitive members 11 disposed along the movement direction, the plurality of primary transfer members 15 provided corresponding to the plurality of photosensitive members 11, respectively, and the electrode member(s) 8 provided so as to contact the inner peripheral surface of the intermediary transfer belt 6 immediately close to the downstream side of at least one primary transfer member 15 with respect to the movement direction. In this embodiment, the image forming apparatus 1 includes the plurality of electrode members 8 provided so as to contact the intermediary transfer belt 6 immediately close to the downstream side of all the plurality of primary transfer members 15 with respect to the movement direction.

As described above, according to this embodiment, by the action of the potential regulating member 8, the increase in charge amount of the toner is suppressed, so that the transfer property of the toner image onto the embossed paper can be improved.

Incidentally, in this embodiment, as the recording material S relatively difficult in transfer of the toner image thereon, the embossed paper was cited as an example, but a similar effect can be expected also on a recording material relatively high in electric resistance (high-resistance paper), such as synthetic paper or a resin film, which principally comprises a synthetic resin material. Further, in this embodiment, as the secondary transfer voltage, only the DC voltage was used, but in the case where as the secondary transfer voltage, a voltage in the form of the DC voltage biased with the AC voltage is used, in order to output a good image, it is advantageous to facilitate transfer of the toner image onto the recording material in accordance with this embodiment.

Embodiment 2

Next, another embodiment of the present invention will be described. The basic structure and operation of an image forming apparatus of this embodiment are the same as those of the image forming apparatus of the embodiment 1. Therefore, in the image forming apparatus of this embodiment, elements having the same or corresponding functions or structures as those of the image forming apparatus of the embodiment 1 are denoted by the same reference numerals or symbols as those of the embodiment 1, and detailed description thereof will be omitted.

In this embodiment, similarly as in the embodiment 1, on sides downstream of the primary transfer portions N1*y*, N1*m*, N1*c*, and N1*k*, the potential regulating members 8*y*, 8*m*, 8*c*, and 8*k* are provided, respectively, in contact with the inner peripheral surface of the intermediary transfer belt 6. In this embodiment, the potential regulating members 8*y*, 8*m*, 8*c*, and 8*k* provided in the primary transfer portions N1*y*, N1*m*, N1*c*, and N1*k* have the substantially same constitution. Further, in this embodiment, the shape of the potential regulating member 8 is different from the shape of the potential regulating member 8 in the embodiment 1.

First, the shape of the potential regulating member 8 in this embodiment will be described. Part (a) of FIG. 16 is a sectional view (cross section substantially perpendicular to a rotational axis direction of the photosensitive drum 11) of the potential regulating member 8 in this embodiment. Further, part (b) of FIG. 16 is a perspective view of the potential regulating member 8 in this embodiment.

In this embodiment, the potential regulating member 8 is constituted by a curved plate which is provided along the widthwise direction of the intermediary transfer belt 6 and which is curved in a convexly curved shape toward the photosensitive drum 11 side in the cross section substantially perpendicular to the rotational axis direction of the photosensitive drum 11. In this embodiment, the contact surface 83 which is the contact portion of the potential regulating member 8 contacting the inner peripheral surface of the intermediary transfer belt 6 is the convexly curved surface toward the photosensitive drum 11. Thus, by shaping the contact surface 83 in the curved surface shape, a stress when the contact surface 83 slides with the intermediary transfer belt 6 is alleviated, so that it is possible to reduce a possibility of an occurrence of scars on the inner peripheral surface of the intermediary transfer belt 6.

To the potential regulating member 8, the potential regulating power source 80 is connected. In this embodiment, at least at the time of the primary transfer during the image forming operation, to the potential regulating member 8, a potential regulating voltage similar to the potential regulating voltage in the embodiment 1 is applied. By this, it is possible to suppress the electric discharge between the intermediary transfer belt 6 and the photosensitive drum 11 on a side downstream of the primary transfer portion N1.

The potential regulating member 8 in this embodiment is a member long in the widthwise direction of the intermediary transfer belt 6 similarly as in the embodiment 1. In this embodiment, the length of the contact surface 83 of the potential regulating member 8 in the longitudinal direction is longer than the maximum image width of the intermediary transfer belt 6 with respect to the widthwise direction and a width in which the primary transfer roller 15 contacts the intermediary transfer belt 6 with respect to the widthwise direction of the intermediary transfer belt 6. On the other hand, in this embodiment, the length of the potential regulating member 8 in the longitudinal direction is shorter than the width of the intermediary transfer belt 6.

Further, the potential regulating member 8 in this embodiment can be constituted only by, for example, a single material having electroconductivity similarly as in the embodiment 1. In this embodiment, the potential regulating member 8 is constituted substantially only of metal having electroconductivity, such as SUS. However, similarly as described in the embodiment 1, the potential regulating member 8 may also be constituted by two or more materials.

For example, similarly as the potential regulating member 8 shown in FIG. 4, as a constitution including the base portion and the surface layer, the surface layer constituting the contact surface 83 can be formed of the electroconductive material, and the base portion can be formed of the non-electroconductive material.

Further, for example, similarly as the potential regulating member 8 shown in FIG. 5, the contact surface 83 may also be formed of the electroconductive nonwoven fabric or the like. Thus, the contact surface 83 of the potential regulating member 8 which is the curved surface is constituted by a flexible material or an elastic material, so that it is possible to further reduce a possibility of an occurrence of scars on an inner peripheral surface of the intermediary transfer belt 6 caused by friction (slide) between the inner peripheral surface of the intermediary transfer belt 6 and the potential regulating member 8.

Next, an arrangement of the potential regulating member 8 in this embodiment will be described. FIG. 17 is a sectional view (cross section substantially perpendicular to the rotational axis direction of the photosensitive drum 11) for illustrating the arrangement of the potential regulating member 8 provided between two primary transfer portions N1 adjacent to each other in the feeding direction of the intermediary transfer belt 6. In FIG. 17, as an example, a potential regulating member 8*c* provided between the primary transfer portions N1*c* for cyan and N1*k* for black is shown (the same applies hereinafter for FIG. 18).

In this embodiment, similarly as in the embodiment 1, an outer diameter of the photosensitive drum 11 is 30 mm, an outer diameter of the primary transfer roller 15 is 18 mm, and a thickness of the intermediary transfer belt 6 is 0.350 mm. Further, in this embodiment, the primary transfer roller 15 is offset toward a downstream side relative to the photosensitive drum 11. The offset amount X1 is 3 mm.

Here, the rectilinear line L is defined similarly as in the embodiment 1. In addition, the above-described upstream stretching portion C and the above-described downstream stretching portion D are defined similarly as in the embodiment 1. In addition, similarly as in the embodiment 1, the upstream end portion of the contact surface 83 is defined as the upstream end A, and the downstream end portion of the contact surface 83 is defined as the downstream end B. Incidentally, in this embodiment, the upstream end A and the downstream end B do not necessarily correspond to the upstream-side end portion and the downstream-side end portion of the potential regulating member 8, respectively. In this embodiment, the upstream-side end portion of the potential regulating member 8 is separately defined as "E (or a member upstream end E)". The upstream end A of the contact surface 83 and the member upstream end E of the potential regulating member 8 may also coincide with each other.

Similarly as in the embodiment 1, the potential regulating member 8 is disposed downstream of and close to the primary transfer portion N1 so as not to contact the primary transfer roller 15 and the photosensitive drum 11 via the intermediary transfer belt 6. At this time, as the upstream end A is closer to the primary transfer portion N1, the above-described electric charge suppressing effect becomes larger. In this embodiment (FIG. 17), the potential regulating member 8 is disposed in a position downstream of the primary transfer portion N1 so that a distance X2 from the primary transfer roller 15 to the member upstream end E becomes about 8 mm. Here, the distance X2 is a distance between the rotation center of the primary transfer roller 15 and the member upstream end E in a direction along the common tangential line on a side where the plurality of photosensitive drums 11 contact the intermediary transfer belt 6 in the cross section substantially perpendicular to the rotational axis direction of the photosensitive drum 11.

Further, in this embodiment, the potential regulating member 8 is pressed against the inner peripheral surface of the intermediary transfer belt 6 by a pressing spring 87 (part (b) of FIG. 16) at each of opposing end portions thereof with respect to the longitudinal direction thereof. At this time, in this embodiment, a pressing force of the pressing spring 87 is set (adjusted) so that the upstream end A and the downstream end B of the contact surface 83 are caused to enter the photosensitive drum 11 side relative to the rectilinear line L. Similarly as in the embodiment 1, a contact width X3 which is a length of the contact surface 83, in the feeding direction of the intermediary transfer belt 6, which is the contact portion of the potential regulating member 8 contacting the inner peripheral surface of the intermediary transfer belt 6 may preferably be about 5 to 50 mm, typically about 5 to 30 mm. That is, in this embodiment, of the curved surface of the potential regulating member 8 on the intermediary transfer belt 6 side, a region (contact surface 83) from the upstream end A to the downstream end B of the range of the contact width as described above contacts the inner peripheral surface of the intermediary transfer belt 6 and enters the photosensitive drum 11 side relative to the rectilinear line L.

Thus, the contact surface 83 of the potential regulating member 8 is caused to enter the photosensitive drum 11 side relative to the rectilinear line L, even in the case where waving or vibration occurs on the intermediary transfer belt 6 during the image forming operation (during the traveling of the intermediary transfer belt 6), so the potential regulating member 8 can be stably surface-contacted to the intermediary transfer belt 6. Further, as in this embodiment, in the case where the contact surface 83 is the convexly curved surface toward the photosensitive drum 11, the intermediary transfer belt 6 and the potential regulating member 8 can be surface-contacted to each other more reliably by entrance of the contact surface 83 itself toward the photosensitive drum 11 side relative to the rectilinear line L in the above-described manner.

Thus, in this embodiment, the contact portion 83 of the electrode member 8 contacting the inner peripheral surface of the intermediary transfer belt 6 is the convexly curved surface toward the photosensitive member side.

As described above, also by the constitution of this embodiment, a similar effect to the effect of the embodiment 1 can be obtained. Further, according to the constitution of this embodiment, the intermediary transfer belt 6 and the potential regulating member 8 can be surface-contacted to each other more easily.

Incidentally, in this embodiment, the contact surface 83 is made the curved surface by constituting the potential regulating member 8 with the curved plate, but as shown in FIG. 18, the contact surface 83 may also be made the curved surface by using a roller-shaped potential regulating member 83. In this case, the roller-shaped potential regulating member 8 may be rotatable or may be provided fixedly without being rotated. Further, this roller-shaped potential regulating member 8 can be constituted by a metal roller, for example, but may also be constituted by two or more materials similarly as described in the embodiment 1. For example, similarly as the potential regulating member 8 shown in FIG. 4, the constitution including the base portion and the surface layer is employed, so that the surface layer constituting the contact surface 83 can be formed of the electroconductive material, and the base portion can be formed of the electroconductive material or the non-electroconductive material. Further, for example, similarly as the potential regulating member 8 shown in FIG. 5, the contact surface 83 may be formed of the electroconductive nonwoven fabric.

Embodiment 3

Next, another embodiment of the present invention will be described. The basic structure and operation of an image forming apparatus of this embodiment are the same as those of the image forming apparatus of the embodiment 1. Therefore, in the image forming apparatus of this embodiment, elements having the same or corresponding functions or structures as those of the image forming apparatus of the embodiment 1 are denoted by the same reference numerals or symbols as those of the embodiment 1, and detailed description thereof will be omitted.

In this embodiment, similarly as in the embodiment 1, on sides downstream of the primary transfer portions N1*y*, N1*m*, N1*c*, and N1*k*, the potential regulating members 8*y*, 8*m*, 8*c*, and 8*k* are provided, respectively, in contact with the inner peripheral surface of the intermediary transfer belt 6. In this embodiment, the potential regulating members 8*y*, 8*m*, 8*c*, and 8*k* provided in the primary transfer portions N1*y*, N1*m*, N1*c*, and N1*k* have the substantially same constitution. Further, in this embodiment, the constitution of the potential regulating member 8 is different from the constitution of the potential regulating member 8 in the embodiment 1.

The constitution of the potential regulating member 8 in this embodiment will be described. Part (a) of FIG. 19 is a sectional view (cross section substantially perpendicular to a rotational axis direction of the photosensitive drum 11) of the potential regulating member 8 in this embodiment. Further, part (b) of FIG. 19 is a perspective view of the potential regulating member 8 in this embodiment. In this embodiment, the potential regulating member 8 is constituted by including an electroconductive contact member 89 and a non-electroconductive supporting member 88 for supporting the contact member 89. In this embodiment, the contact member 89 as the electrode member is constituted by a flat plate provided along the widthwise direction of the intermediary transfer belt 6. In this embodiment, the contact surface 83 which is the contact portion of the contact member 89 contacting the inner peripheral surface of the intermediary transfer belt 6 is a flat surface. Further, to the contact member 89, the potential regulating power source 80 is connected. Further, in this embodiment, an end of the supporting member 88 on the primary transfer roller 15 side with respect to a direction along the feeding direction of the intermediary transfer belt 6 is provided with a projected portion 88*a* so as to shield a space between the primary transfer roller 15 and the contact member 89 with respect to the feeding direction. The purpose of providing the projected portion 88*a* is to prevent space electric discharge between the primary transfer roller 15 and the contact member 89.

In this embodiment, the contact member 89 is pressed against the inner peripheral surface of the intermediary transfer belt 6 in a manner such that the contact member 89 is pushed out from the supporting member 88 toward the intermediary transfer belt 6 so as to surface-contact the intermediary transfer belt 6 with reliability even when the supporting member 88 is provided with the projected portion 88*a*. In this embodiment, the contact member 89 is pressed against the inner peripheral surface of the intermediary transfer belt 6 by a pressing spring 87 constituted by a compression coil spring which is an urging member as an urging means at each of opposing portions thereof with respect to the longitudinal direction thereof. In this embodiment, this pressing spring 87 is provided between the contact member 89 and the supporting member 88, and urges the contact member 89 in a direction from a back surface thereof (surface opposite from the contact surface 83) toward the intermediary transfer belt 6.

Incidentally, the urging member as the urging means is not limited to the pressing spring 87, but a material having elastically deformable property (elasticity), such as sponge or nonwoven fabric may be used.

Further, the supporting member 88 may be pressed toward the intermediary transfer belt 6 by the urging member as the urging means. For example, a constitution in which the supporting member 88 is pressed toward the inner peripheral surface of the intermediary transfer belt 6 by the urging member at each of opposing portions thereof with respect to the longitudinal direction thereof. Also, by this, the contact member 89 can be pressed against the inner peripheral surface of the intermediary transfer belt 6. In this case, the contact member 89 may be fixed to the supporting member 88.

Thus, the image forming apparatus 1 includes the urging member 87 for urging the electrode member (contact member) 89 in a direction from the back surface thereof toward the intermediary transfer belt 6 so that the contact portion (contact surface) 83 contacts the inner peripheral surface of the intermediary transfer belt 6. This urging member 87 may be constituted by using a spring, a sponge, or a nonwoven fabric, which are elastically deformable.

As described above, also by the constitution of this embodiment, a similar effect to the effect of the embodiment 1 can be obtained. Further, according to the constitution of this embodiment, the intermediary transfer belt 6 and the potential regulating member 8 (contact member 89) can be surface-contacted to each other more easily.

Other Embodiments

As described above, the present invention was described based on specific embodiments, but is not limited to the above-described embodiments.

In the above-described embodiments, the potential regulating power source was provided independently for each of the image forming units, but may also be made common to the plurality (or all) of image forming units.

The same applies to the charging power source, the developing power source, and the primary transfer power source.

Further, in this embodiment, the potential regulating member (electrode member) of which contact surface contacting the intermediary transfer belt is the flat surface was the plate-like member formed of the metal plate or the like, but may also be in another form such as a block-like member having a rectangular cross section, for example. The same applies to the potential regulating member (electrode member) of which contact surface contacting the intermediary transfer belt is the curved surface.

Further, in the above-described embodiments, the predetermined charge polarity of the photosensitive member was the negative polarity, but is not limited thereto. The predetermined charge polarity of the photosensitive member may also be the positive polarity. Similarly, in the above-described embodiments, the normal charge polarity of the toner was the negative polarity, but may also be the positive polarity. Various applied voltages in the case where the predetermined charge polarity of the photosensitive member and the normal charge polarity of the toner are the positive polarity may only be required to be appropriately changed such that these polarities are changed to the polarity opposite to the polarity in the above-described embodiments in accordance with the above-described embodiments.

Further, the image forming apparatus is not limited to the image forming apparatus capable of forming a full-color image, but may also be an image forming apparatus capable of forming only a monochromatic (white/black or monocolor) image.

According to the present invention, the transfer property of the toner image onto the recording material, relatively difficult in transfer of the toner image, such as the embossed paper in the image forming apparatus of the intermediary transfer type can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185330 filed on Nov. 18, 2022, and No. 2023-129659 filed on Aug. 8, 2023, which are hereby incorporated by reference herein in their entirety.

What is claimed is:

1. An image forming apparatus comprising:

a first image bearing member configured to bear a toner image;

a second image bearing member configured to bear a toner image;

an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt;

a first transfer member provided downstream of the first image bearing member with respect to the movement direction of the intermediary transfer belt and configured to transfer the toner image from the first image bearing member onto the intermediary transfer belt in a first transfer portion under application of a first transfer voltage;

a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt and that includes a contact portion contacting an inner surface of the intermediary transfer belt, wherein a voltage of a polarity opposite to a polarity of the first transfer voltage is applied to the electrode member, wherein in a cross-section perpendicular to a rotational axis of the first image bearing member, when a common tangential line between the first transfer member and the second image bearing member on an intermediary transfer belt side is a rectilinear line L, a rectilinear line passing through a rotation center of the first image bearing member and a rotation center of the first transfer member is a rectilinear line P, and a rectilinear line passing through an intersection point between the rectilinear line P and the first image bearing member and perpendicular to the rectilinear line P is a rectilinear line Q, the electrode member is configured so that the contact portion is positioned further on a first image bearing member side than the rectilinear line L is and further on a first transfer member side than the rectilinear line Q is.

2. An image forming apparatus according to claim 1, wherein in the cross-section perpendicular to the rotational axis direction of the first image bearing member, in a perpendicular direction perpendicular to a direction along a common tangential line between the first image bearing member and the second image bearing member, an entering amount of the contact portion into the rectilinear line L is 5% or more and 80% or less when the entering amount is defined as 100% when the contact portion enters to the rectilinear line Q.

3. An image forming apparatus according to claim 1, wherein in the cross-section perpendicular to the rotational axis direction of the first image bearing member, in a perpendicular direction perpendicular to a direction along a common tangential line between the first image bearing member and the second image bearing member, an entering amount of the contact portion into the rectilinear line L is 10% or more and 50% or less when the entering amount is defined as 100% when the contact portion enters to the rectilinear line Q.

4. An image forming apparatus according to claim 1, wherein the contact portion contacts an inner peripheral surface of the intermediary transfer belt at a surface thereof.

5. An image forming apparatus according to claim 1, wherein the contact portion is a flat surface.

6. An image forming apparatus according to claim 1, wherein the contact portion is a curved surface convex toward the first image bearing member.

7. An image forming apparatus according to claim 1, wherein a length of the contact portion in the movement direction of the intermediary transfer belt is 5 mm or more and 50 mm or less.

8. An image forming apparatus according to claim 1, wherein a length of the contact portion in the movement direction of the intermediary transfer belt is not more than a half of a center distance between the first image bearing member and the second image bearing member in a cross-section substantially perpendicular to a widthwise direction of the intermediary transfer belt.

9. An image forming apparatus according to claim 1, wherein the contact portion is formed with an electroconductive material.

10. An image forming apparatus according to claim 9, wherein the contact portion is formed with electroconductive metal.

11. An image forming apparatus according to claim 9, wherein the contact portion is formed with electroconductive fibers.

12. An image forming apparatus according to claim 1, wherein the electrode member includes a non-electroconductive supporting portion for supporting the contact portion, and the supporting portion is provided so as to contact the intermediary transfer belt on a side upstream of the contact portion with respect to the movement direction of the intermediary transfer belt.

13. An image forming apparatus according to claim 1, further comprising an urging member configured to urge the electrode member from a rear surface of the electrode member in a direction toward the intermediary transfer belt so that the contact portion contacts an inner peripheral surface of the intermediary transfer belt.

14. An image forming apparatus according to claim 13, wherein the urging member is formed with a spring, a sponge, or a nonwoven fabric, which is elastically deformable.

15. An image forming apparatus according to claim 1, wherein an entering amount of the electrode member into the rectilinear line L of the contact portion is 0.3 mm or more and 5 mm or less.

16. An image forming apparatus according to claim 1, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is 1 mm or more and 20 mm or less.

17. An image forming apparatus according to claim 1, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is shorter than a radius of the first transfer member.

18. An image forming apparatus comprising:

a first image bearing member configured to bear a toner image;

a second image bearing member configured to bear a toner image;

an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt;

a first transfer member provided downstream of the first image bearing member with respect to the movement direction of the intermediary transfer belt and configured to transfer the toner image from the first image bearing member onto the intermediary transfer belt in a first transfer portion under application of a first transfer voltage;

a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt and that includes a contact portion contacting an inner surface of the intermediary transfer belt, wherein a voltage of a polarity opposite to a polarity of the first transfer voltage is applied to the electrode member, wherein when in a cross-section perpendicular to a rotational axis of the first image bearing member, with respect to the movement direction of the intermediary transfer belt, a downstream end of a contact portion between a member stretching the intermediary transfer belt upstream of the electrode member and the intermediary transfer belt is a point C, an upstream end of a contact portion between a member stretching the intermediary transfer belt downstream of the electrode member and the intermediary transfer belt is a point D, a rectilinear line passing through the point C and the point D is a rectilinear line L, a rectilinear line passing through a rotation center of the first image bearing member and a rotation center of the first transfer member is a rectilinear line P, and a rectilinear line passing through an intersection point between the rectilinear line P and the first image bearing member and perpendicular to the rectilinear line P is a rectilinear line Q, the electrode member is configured so that the contact portion of the electrode member is positioned further on a first image bearing member side than the rectilinear line L is and further on a first transfer member side than the rectilinear line Q is.

19. An image forming apparatus comprising:

a first image bearing member configured to bear a toner image;

a second image bearing member configured to bear a toner image;

an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt;

a first transfer member provided downstream of the first image bearing member with respect to the movement direction of the intermediary transfer belt and configured to transfer the toner image from the first image bearing member onto the intermediary transfer belt in a first transfer portion under application of a first transfer voltage;

a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt and that includes a contact portion contacting an inner surface of the intermediary transfer belt, wherein a voltage of a polarity opposite to a polarity of the first transfer voltage is applied to the electrode member, wherein in a cross-section perpendicular to a rotational axis of the first image bearing member, a downstream end of a contact portion contacting the first transfer member and the intermediary transfer belt in the movement direction of the intermediary transfer belt is a point C, a tangential line of the second photosensitive member passing through the point C and passing through a side where the intermediary transfer belt is disposed is a rectilinear line L, a rectilinear line passing through a rotation center of the first image bearing member and a rotation center of the first transfer member is a rectilinear line P, and a rectilinear line passing through an intersection point between the rectilinear line P and the first image bearing member and perpendicular to the rectilinear line P is a rectilinear line Q, the electrode member is configured so that the contact portion of the electrode member is positioned further on a first image bearing member side than the rectilinear line L is and further on a first transfer member side than the rectilinear line Q is.

20. An image forming apparatus comprising:

a first image bearing member configured to bear a toner image;

a second image bearing member configured to bear a toner image;

an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt;

a first transfer member provided downstream of the first image bearing member with respect to the movement direction of the intermediary transfer belt and configured to transfer the toner image from the first image bearing member onto the intermediary transfer belt in a first transfer portion under application of a first transfer voltage;

a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt and that includes a contact portion contacting an inner surface of the intermediary transfer belt, wherein a voltage of a polarity opposite to a polarity of the first transfer voltage is applied to the electrode member, wherein in a cross-section perpendicular to a rotational axis of the first image bearing member, a rectilinear line passing through a rotation center of the first image bearing member and a rotation center of the first transfer member is a rectilinear line P, and a rectilinear line passing through an intersection point between the rectilinear line P and the first image bearing member and perpendicular to the rectilinear line P is a rectilinear line Q, wherein when the electrode member is in an operating position where the electrode member is positioned during image formation, the electrode member is configured so as to be positioned in a position where the inner surface of the intermediary transfer belt is pushed upwardly, and wherein the electrode member is configured so that the contact portion is positioned further on a first transfer member side than the rectilinear line Q is.

21. An image forming apparatus according to claim 20, wherein the contact portion contacts an inner peripheral surface of the intermediary transfer belt at a surface thereof.

22. An image forming apparatus according to claim 20, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is 1 mm or more and 20 mm or less.

23. An image forming apparatus according to claim 20, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is shorter than a radius of the first transfer member.

24. An image forming apparatus comprising:

a first image bearing member configured to bear a toner image;

a second image bearing member configured to bear a toner image;

an intermediary transfer belt onto which the toner images are transferred from the first image bearing member and the second image bearing member, wherein the first image bearing member is provided adjacent to the second image bearing member on a side upstream of the second image bearing member with respect to a movement direction of the intermediary transfer belt;

a first transfer member provided downstream of the first image bearing member with respect to the movement direction of the intermediary transfer belt and configured to transfer the toner image from the first image bearing member onto the intermediary transfer belt in a first transfer portion under application of a first transfer voltage;

a second transfer member provided downstream of the second image bearing member with respect to the movement direction of the intermediary transfer belt and configured to transfer the toner image from the second image bearing member onto the intermediary transfer belt in a second transfer portion under application of a second transfer voltage; and an electrode member provided downstream of the first transfer portion and upstream of the second transfer portion with respect to the movement direction of the intermediary transfer belt, wherein a voltage of a polarity opposite to a polarity of the first transfer voltage is applied to the electrode member, wherein the electrode member is disposed in a position separated from an inner surface of the intermediary transfer belt during image formation.

25. An image forming apparatus according to claim 24, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is 1 mm or more and 20 mm or less.

26. An image forming apparatus according to claim 24, wherein when an upstream end of the contact portion of the electrode member with respect to a rotational direction of the intermediary transfer belt is a point A, and a distance between the rotation center of the first transfer member and the point A in a direction along a common tangential line between the first image bearing member and second image bearing member is a distance X2, the distance X2 is shorter than a radius of the first transfer member.

* * * * *